United States Patent
Ohmuro et al.

(10) Patent No.: US 6,532,054 B2
(45) Date of Patent: Mar. 11, 2003

(54) LIQUID CRYSTAL DISPLAY AND METHOD FOR FABRICATING THE SAME

(75) Inventors: Katsufumi Ohmuro, Kawasaki (JP); Kunihiro Tashiro, Kawasaki (JP); Takahiro Sasaki, Kawasaki (JP); Shingo Kataoka, Kawasaki (JP); Takuya Yoshimi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/884,737

(22) Filed: Jun. 19, 2001

(65) Prior Publication Data

US 2001/0043305 A1 Nov. 22, 2001

Related U.S. Application Data

(63) Continuation of application No. PCT/JP99/06731, filed on Dec. 1, 1999.

(30) Foreign Application Priority Data

Dec. 28, 1998 (JP) ............................................. 10-373557

(51) Int. Cl.[7] ...................... G02F 1/1368; G02F 1/1337
(52) U.S. Cl. .......................... 349/143; 349/38; 349/125; 349/129; 349/178
(58) Field of Search ........................ 349/43, 124, 129, 349/139, 143, 191, 38, 39, 178

(56) References Cited

U.S. PATENT DOCUMENTS 5,734,454 A * 3/1998 Omae et al. ................... 349/86
6,008,869 A * 12/1999 Oana et al. ..................... 349/43
6,057,902 A * 5/2000 Angelopoulos et al. ..... 349/129
6,084,647 A * 6/2000 Hatano et al. ................. 349/15
6,097,466 A * 8/2000 Koma .......................... 349/143
6,141,077 A * 10/2000 Hirata et al. ................. 349/143

FOREIGN PATENT DOCUMENTS

| JP | 63014123 A | * 1/1988 | ............ G02F/1/133 |
| JP | 63-014123 | 1/1988 | |
| JP | 06-018868 | 1/1994 | |
| JP | 06-095120 | 4/1994 | |
| JP | 06-214235 | 8/1994 | |
| JP | 06214235 A | * 8/1994 | ......... G02F/1/1337 |
| JP | 9-211468 | 8/1997 | |
| JP | 09-325373 | 12/1997 | |

* cited by examiner

Primary Examiner—William L. Sikes
Assistant Examiner—P. R. Akkapeddi
(74) Attorney, Agent, or Firm—Greer, Burns & Crain, Ltd.

(57) ABSTRACT

A liquid crystal display having a first substrate on which a pixel electrode is formed, a second substrate on which an opposed electrode opposed to the first pixel electrode is formed, and a liquid crystal sealed in the space between the first and second substrates, wherein the interval between the pixel electrode and the opposed electrode in the area near the edge of the pixel electrode id longer than that in the other area than the area near the edge of the pixel electrode. Therefore the liquid crystal display has good display characteristics. A method for manufacturing such a liquid crystal display is also disclosed.

18 Claims, 32 Drawing Sheets

UV RADIATION APPLICATION AMOUNTS (J/cm²)

LIQUID CRYSTAL DISPLAY AND METHOD FOR FABRICATING THE SAME

CROSS REFERENCE TO RELATED APPLICATION

This application is a Continuation of PCT application No. PCT/JP99/06731, which was filed on Dec. 1, 1999, and which designated the United States.

TECHNICAL FIELD

The present invention relates to a liquid crystal display and a method for fabricating the liquid crystal display, more specifically to a liquid crystal display of vertical alignment mode, which controls tilt directions of the liquid crystal molecules upon application of voltages, and a method for fabricating the liquid crystal display.

BACKGROUND ART

As a liquid crystal display (LCD: Liquid Crystal Display) using an active matrix, a liquid crystal display of TN (Twisted Nematic) mode, in which a liquid crystal material having positive dielectric anisotropy is aligned horizontal to the substrate face and is capable of being twisted by 90° between the opposed substrates is widely used. However, the liquid crystal display of TN mode has a serious disadvantage of poor viewing angle characteristics. To improve the viewing angle characteristics, various proposals have been made.

Recently, in place of TN mode there has been proposed MVA (Multi-domain Vertical Alignment) mode, in which a liquid material having negative dielectric anisotropy is vertically aligned, and tilt directions of the liquid molecules upon application of voltages are restricted by projections provided on the faces of the substrates.

As shown in FIG. 25, a liquid crystal display of MVA mode, which is a VA (Vertically Aligned) mode liquid crystal display, wherein a liquid crystal material having negative dielectric anisotropy is vertically aligned, comprises projections 128, 150 on substrates 110 and 140 so as to restrict directions in which the liquid crystal molecules 164 are obliquely inclined upon application of voltages to be plural in one picture element, whereby the viewing angle characteristics are improved.

However, in the above-described conventional MVA mode-liquid crystal display, an electric field is extended from a region near the end of a picture element electrode 126 toward a region outside the picture element electrode 126, and lines of electric force 166 are extended as shown in FIG. 25. Accordingly, abnormal domains take place, and disclinations take place as indicated by the shaded portions in FIG. 26, which reduces luminance.

A result of a simulation of transmittance characteristics of the conventional MVA mode liquid crystal display shown in FIG. 25 will be explained with reference to FIG. 27. FIG. 27 is a graph of the result of the simulation of transmittance characteristics of the conventional MVA mode-liquid crystal display.

As shown in FIG. 27, disclinations are present between a projection 128 and the end portion of a picture element electrode 126, which results in transmittance decrease. Thus, the conventional MVA mode-liquid crystal display has found it difficult to provide high luminance.

To improve this problem, it has been proposed to place a projection 188 on a counter electrode 148 in a region near the end portion of a picture element electrode 126, as shown in FIG. 28, so as to decrease abnormal domains. Because of projection 188, the disclinations in the display region disappear as shown in FIG.29, but the projection 188 disposed on the counter electrode 148 reduces luminance by an area of the projection 188.

It is considered to form the projection 188 as outwardly of a picture element electrode as possible, so as to increase luminance. However, when an offset, i.e., a length over which the picture element electrode 126 and the projection 188 overlap each other is 6 μm, the occurrence of disclinations can e prevented as shown in FIG. 29, but when an offset is 5 μm as shown in FIG. 30, the occurrence of disclinations cannot be prevented. When an offset is, e.g., 10 μm as shown in FIG. 31, it is substantially equal to addition of one conventional projection and luminance is further decreased.

In a conventional liquid crystal display which is not of MVA mode, abnormal domains occur in the regions as shaded in FIG. 32 due to transverse electric fields between picture element electrodes 126 and drain bus lines 122. The same problem as in the liquid crystal display of MVA mode takes place.

An object of the present invention is to provide a liquid crystal display having good display characteristics, and a method for fabricating the liquid crystal display.

DISCLOSURE OF THE INVENTION

According to one aspect of the present invention, there is provided a liquid crystal display comprising a first substrate with a picture element electrode formed on, a second substrate with a counter electrode opposed to the picture element electrode, and a liquid crystal sealed between the first substrate and the second substrate, a distance between the picture element electrode and the counter electrode in a vicinity of the end portion of the picture element electrode is larger than a distance between the picture element electrode and the counter electrode in a region except the vicinity of the end portion of the picture element electrode. Transverse extension of an electric field from a vicinity of the end portion of the picture element electrode can be prohibited to thereby preclude occurrence of abnormal domains, whereby occurrence of disclinations can be suppressed. Accordingly, the liquid crystal display can have high luminance.

In the liquid crystal display, it is preferable that the distance between the picture element electrode and the counter electrode in the vicinity of the end portion of the picture element electrode is gradually increased toward a region where the picture element electrode and the counter electrode are not opposed to each other.

BEST MODES FOR THE CARRYING OUT THE INVENTION

A First Embodiment

Figure 1:
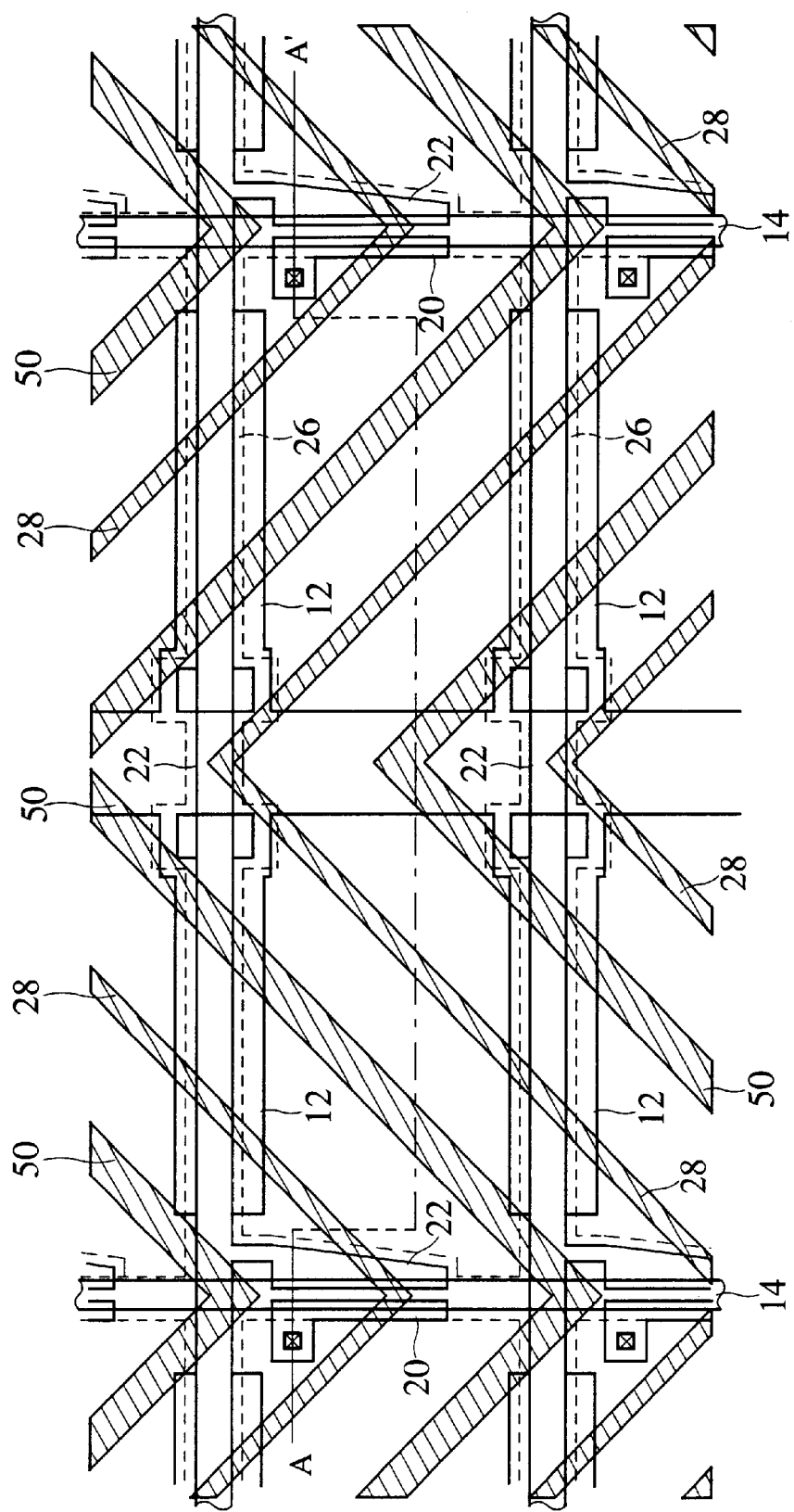
FIG. 1 is a plan view of a liquid crystal display of MVA type.
Figure 2:
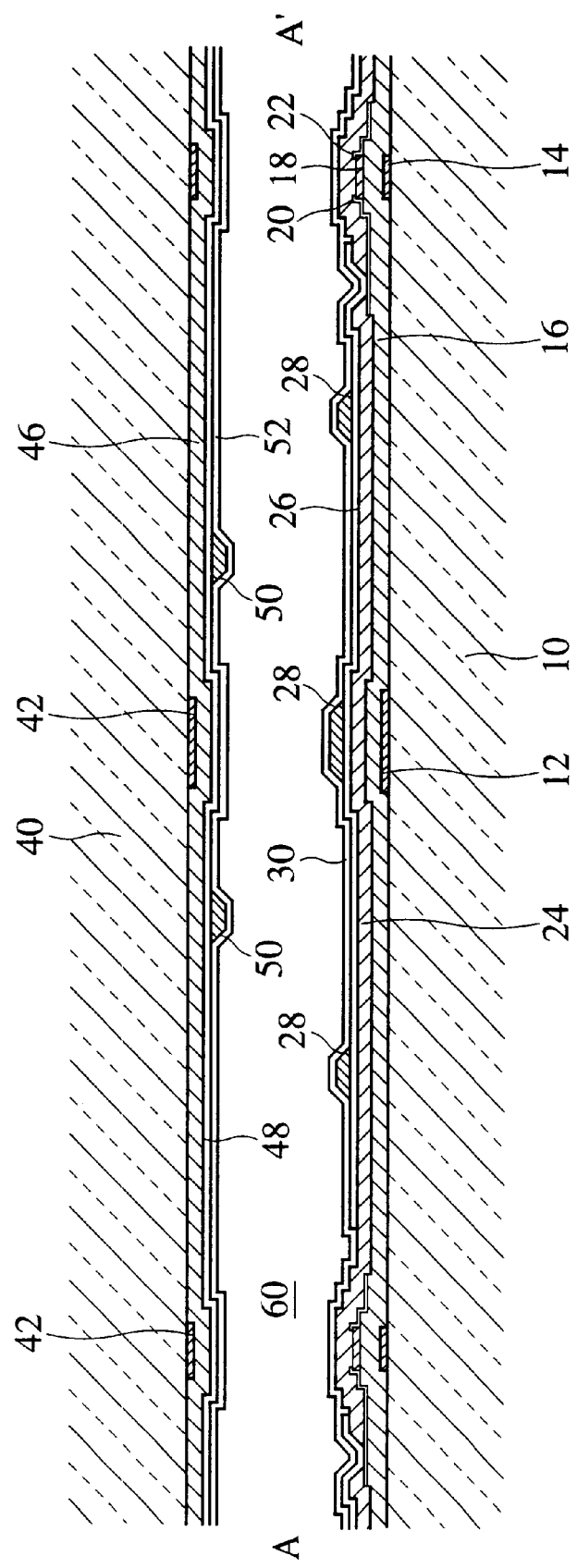
FIG. 2 is a sectional view along the line A–A' in FIG. 1.

First, a structure of a liquid crystal display of MVA type will be explained with reference to FIGS. 1 and 2. FIG. 1 is a plan view of the liquid crystal display of MVA type. FIG. 2 is the sectional view along the line A–A' in FIG. 1.

As shown in FIGS. 1 and 2, CS electrodes (storage capacitor electrodes) 12 for forming storage capacitors, and gate bus lines 14 including the gate electrodes of TFTs are formed on a glass substrate 10. A gate insulation film 16 is formed on the glass substrate 10 with the CS electrodes 12 and the gate bus lines 14 formed thereon. An active layer 18 that forms the channel regions of the TFTs is formed on the gate insulation film 16. On the gate insulation film 16, with the active layer 18 formed thereon, there are formed source electrodes 20 connected to one side of the active layer 18, and drain bus lines 22 including drain electrodes are connected to the other side of the active layer 18.

An insulation film 24 is formed on the gate insulation film 16 with the source electrodes 20 and the drain bus lines 22 formed on. Picture element electrodes 26 are formed on the insulation film 24, connected to the source electrodes 20. Projections 28 of a light transmitting material are formed in a zigzag pattern on the insulation film 24 and the picture element electrodes 26. The material of the projections 28 can be a photosensitive acrylic material, e.g., PC-335 produced by JSR (Japan Synthetic Rubber) Co., Ltd, or others. An alignment film 30 for aligning liquid crystal molecules vertically is formed on the insulation film 24 with the picture element electrode 26 and the projections 28 formed thereon. The material of the alignment film 30 can be, e.g., JALS-204 produced by JSR Co., Ltd, or others.

On the other hand, a black matrix layer 42 is formed on the glass substrate 40. A colored (CF) resin layer 46 forming a color filter is formed on the glass substrate 40 with the black matrix layer 42 formed thereon. A counter electrode 48 is formed on the colored resin layer 46. On the counter electrode 48, projections 50 of a light transmitting material are formed in a zigzag pattern, offset by a half a pitch with respect to the projections 28 formed on the glass substrate 10. An alignment film 30 for vertically aligning the liquid crystal molecules is formed on the counter electrode 48 with projections 50 formed thereon.

The thus-formed glass substrates (TFT substrate) 10 and the glass substrate (CF substrate) 40 are opposed to each other with the alignment films 30, 52 opposed to each other, and a negative liquid crystal material of negative dielectric anisotropy is sealed between the substrates. A liquid crystal material 60 can be, e.g., MJ95785 produced by Merck Japan Limited. Spacers (not shown) for spacing the glass substrates 10, 40 at a prescribed distance are disposed between the glass substrates 10, 40. The spacers can be, e.g., MICROPEARL produced by Sekisui Chemical Co., Ltd, or others. A diameter of the spacers can be, e.g., 3.5 μm. A liquid crystal display of MVA type is thus constituted.

Figure 3:
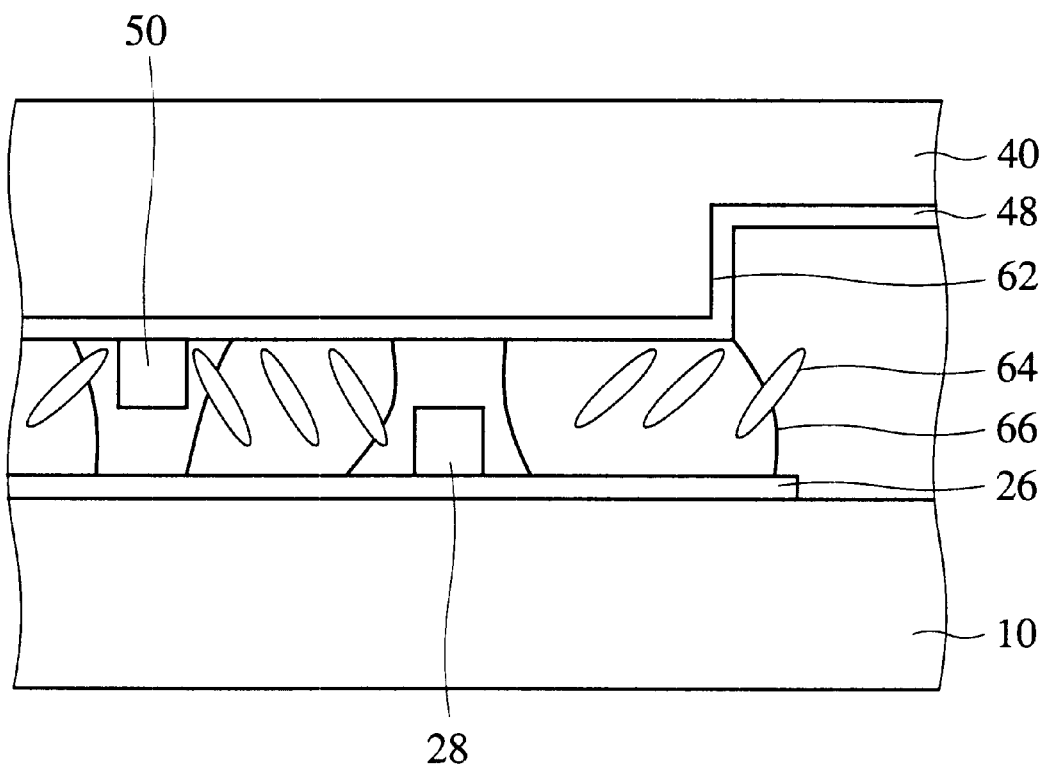
FIG. 3 is a diagrammatic sectional view of the liquid crystal display according to a first embodiment of the present invention.
Figure 4:
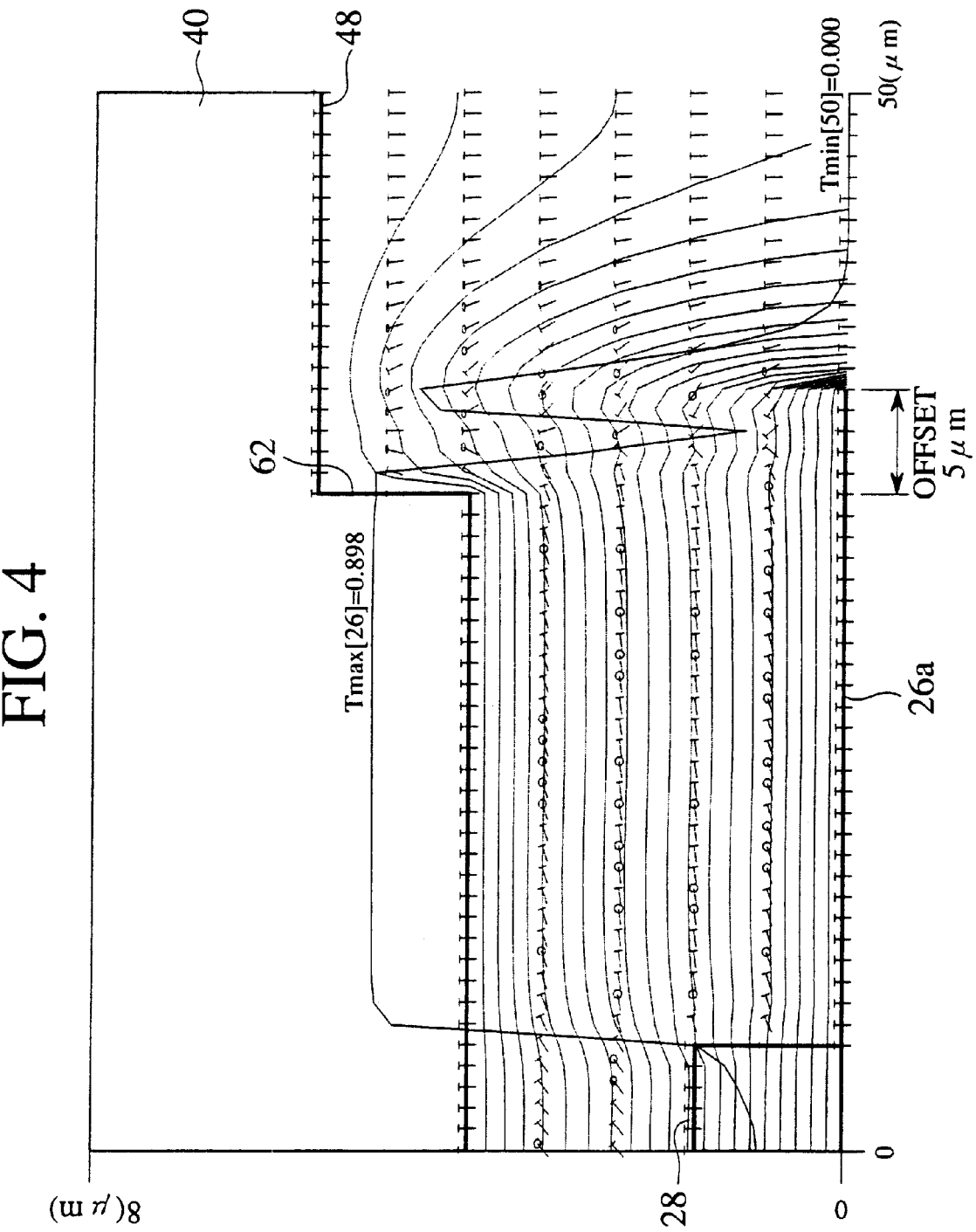
FIG. 4 is a graph of the result of a simulation of transmittance characteristics of the liquid crystal display according to the first embodiment of the present invention.

Next, the liquid crystal display according to a first embodiment of the present invention will be explained with reference to FIGS. 3 and 4. FIG. 3 is a diagrammatic sectional view of the liquid crystal display according to the present embodiment, FIG. 4 is a graph of the result of a simulation of transmittance characteristics of the liquid crystal display according to the present embodiment.

The liquid crystal display according to the present embodiment is characterized mainly in that cavities 62 are formed in the glass substrate 40 of the liquid crystal display of MVA type shown in FIGS. 1 and 2.

Each cavity 62 is formed in the glass substrate 40, overlapping in a vicinity of the end portion of a picture element electrode 26. In other words, the cavity 62 is formed in a region of the glass substrate 40, which is outward of a vicinity of the end portion of the picture element electrode 26. An offset, i.e., a length over which the cavity 62 formed in the glass substrate 40 overlaps the end portion of the picture element electrode 26, can be, e.g., 5 μm. A length of the offset can be set suitably for required display characteristics.

According to the present embodiment, the cavity 62 is formed in the glass substrate 40 in a region which is outward of the vicinity of the end portion of the picture element electrode 26, whereby lines of electric force 66 are as shown in FIG. 3 and can suppress transverse extension of an electric field toward the outer region from the vicinity of the end portion of the picture element electrode 26. The transverse extension of an electric field from the vicinity of the end portion of the picture element electrode 26 toward the outer region can be suppressed, whereby occurrence of abnormal domains can be prevented, and disuniformity of an alignment direction of liquid crystal molecules 64 can be suppressed. Thus, the present embodiment can suppress occurrence of disclinations, and accordingly luminance decrease can be suppressed.

Then, display characteristics of the liquid crystal display according to the present embodiment will be explained with reference to FIG. 4. FIG. 4 is a graph of the result of a simulation of transmittance characteristics of the liquid crystal display according to the present embodiment. In FIG. 4, distances in the horizontal direction of the substrate from a reference point are taken on the horizontal axis, and distances in the vertical direction of the substrate from the reference point are taken on the vertical axis. $T_{max}[26]=0.898$ means that a maximum value of the transmittance is present at a position spaced by 26 μm from a measuring point as the reference point in the horizontal direction of the substrate, and a maximum value of the transmittance is 0.898. $T_{min}[50]=0.000$ means that a minimum value of the transmittance is present at a position spaced by 50 μm from a measuring point as the reference point in the horizontal direction of the substrate, and a minimum value of the transmittance is 0.000. This is the same with the other graphs and will not be repeatedly explained.

As shown in FIG. 4, in the present embodiment, the region with the picture element electrodes 26 and the counter electrode 40 opposed to each other, which is other than region with the projections 28 provided thereon, has substantially uniform transmittance characteristics without disclinations.

Thus, liquid crystal display according to the present embodiment can suppress occurrence of disclinations, and can have high luminance.

A First Modification

Figure 5:
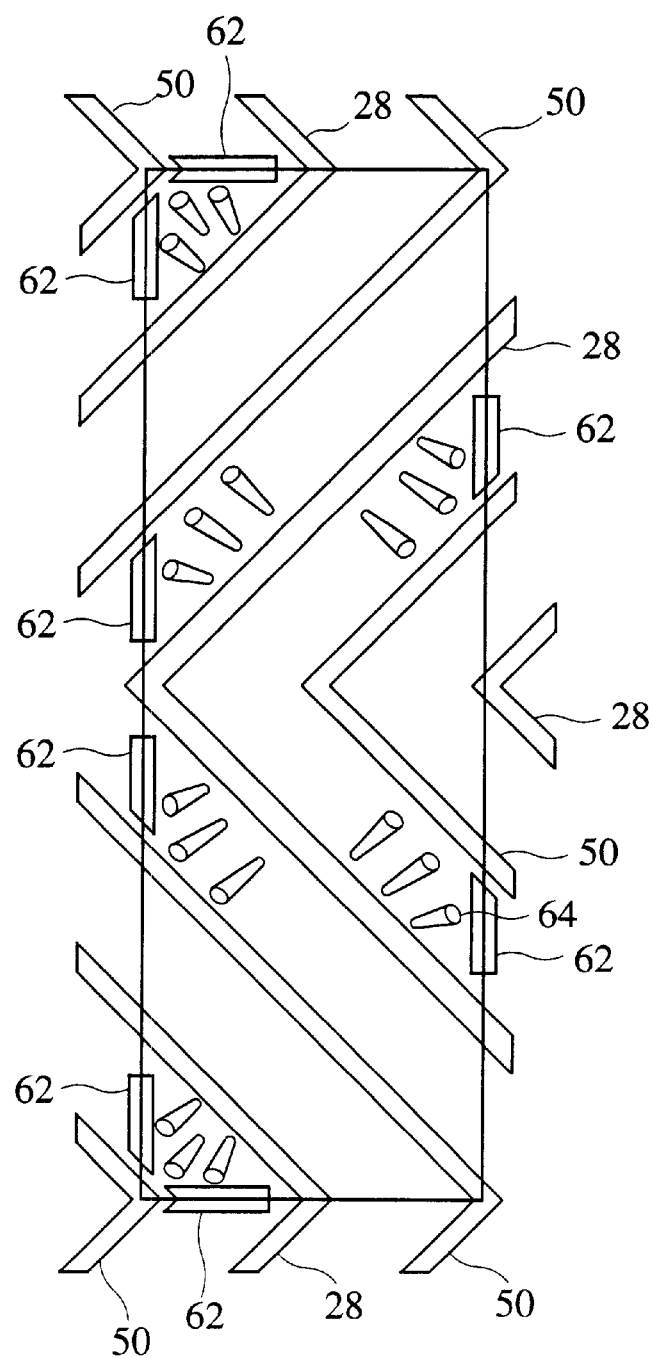
FIG. 5 is a diagrammatic plan view of the liquid crystal display according to a modification of the first embodiment of the present invention.

Then, a first modification of the liquid crystal display according to the present embodiment will be explained with reference to FIG. 5. FIG. 5 is a diagrammatic plan view of the liquid crystal display according to the present modification.

In the liquid crystal display according to the present modification, cavities 62 are formed in the glass substrate 40 only in regions where abnormal domains tend to occur.

According to the present modification, the cavities 62 are formed at least in regions where abnormal domains tend to occur, whereby occurrence of disclinations can be suppressed, and the liquid crystal display can have good display characteristics.

A Second Modification

Figure 6:
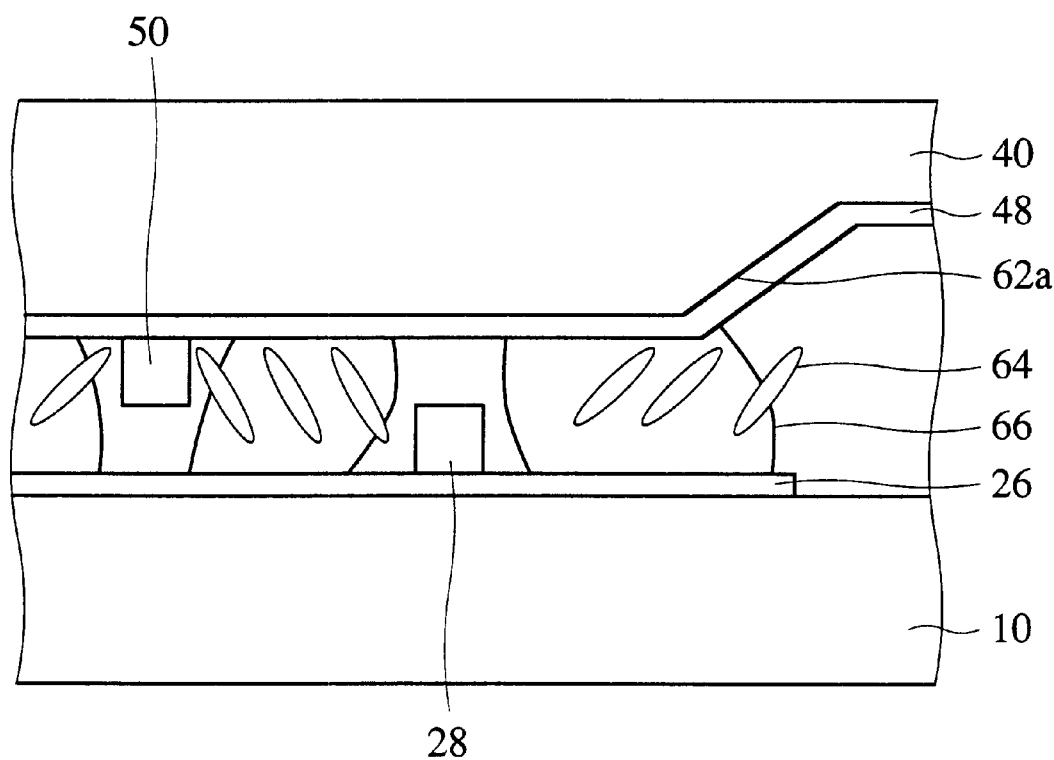
FIG. 6 is a diagrammatic sectional view of the liquid crystal display according to a modification of the first embodiment of the present invention.

Then, a second modification of the liquid crystal display according to the present embodiment will be explained with reference to FIG. 6. FIG. 6 is a diagrammatic sectional view of the liquid crystal display according to the present modification.

The liquid crystal display according to the present modification is characterized mainly in that cavities 62a of tapered end sectional view are formed in the glass substrate 40. That is, cavities 62a, in contrast to the cavities shown in FIG. 3, which are formed in the glass substrate 40 of the liquid crystal display, do not essentially have right-angular cross-section. Each cavity 62a may have cross-section which is tapered to an extent that an electric field does not extend outward from the vicinity of the end portion of a picture element electrode 26. The cavities 62a may be formed only in regions where abnormal domains tend to occur.

A Second Embodiment

Figure 7:
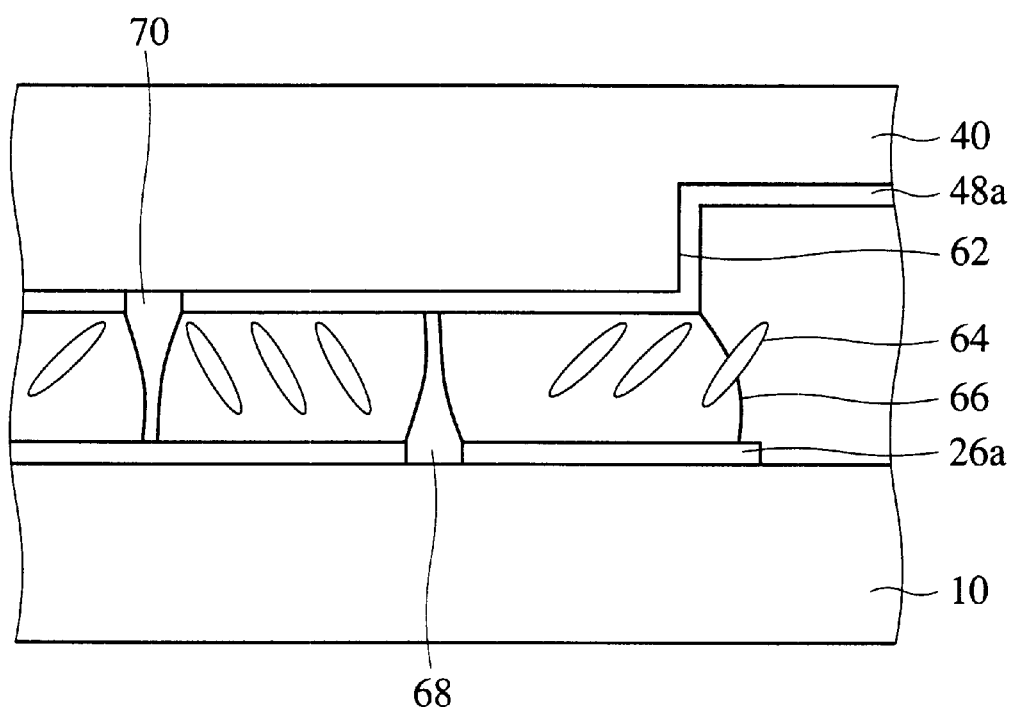
FIG. 7 is a diagrammatic sectional view of the liquid crystal display according to a second embodiment of the present invention.
Figure 8:
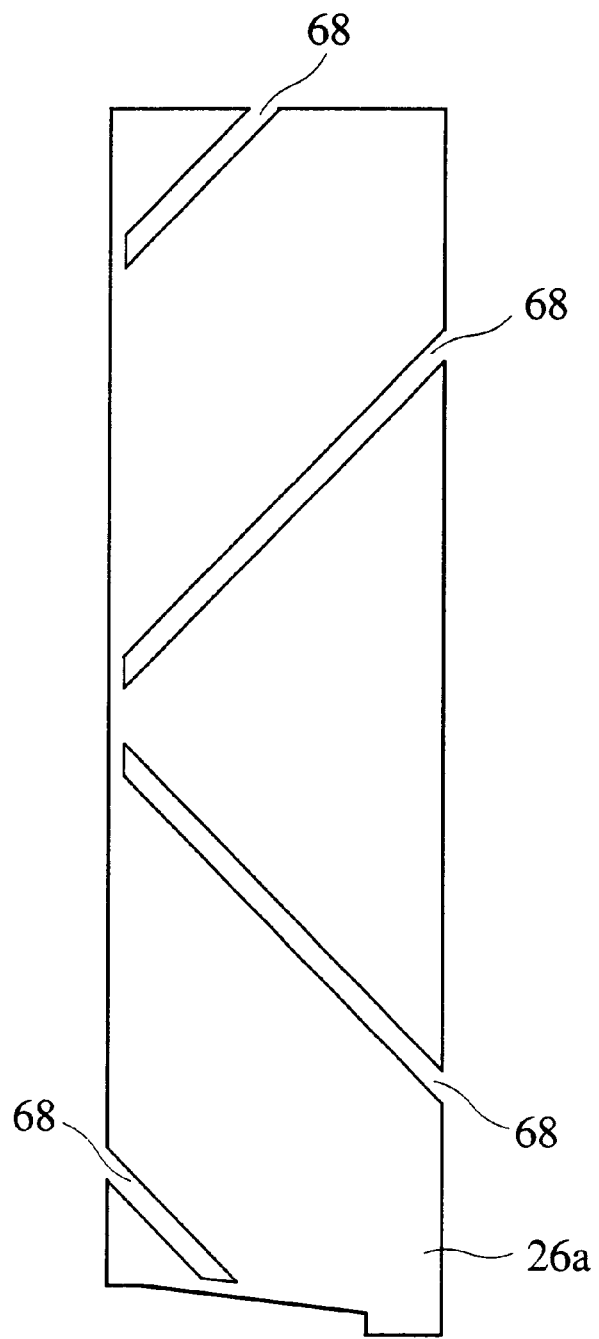
FIG. 8 is a plan view of a picture element electrode of the liquid crystal display according to the second embodiment of the present invention.
Figure 9:
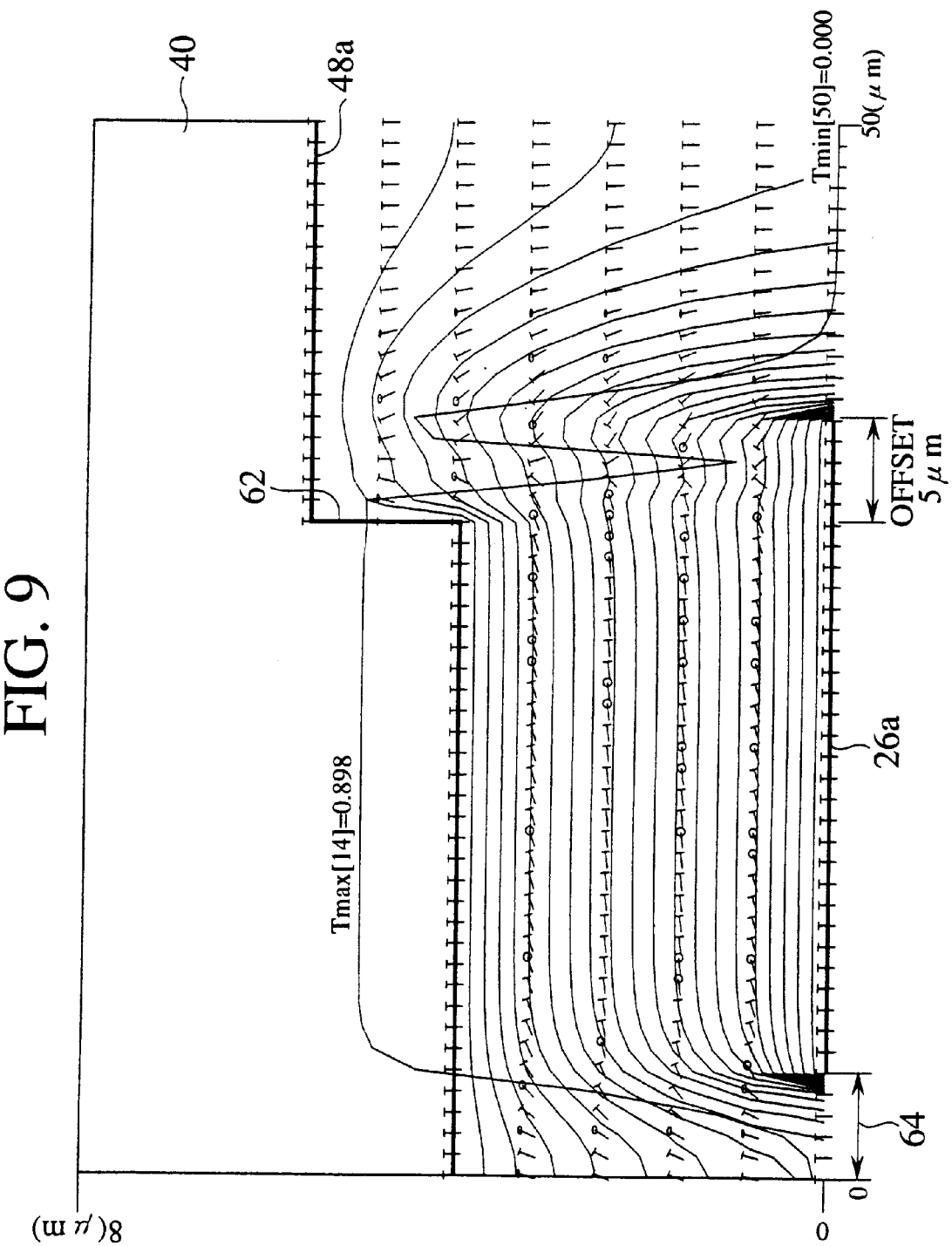
FIG. 9 is a graph of the result of simulation of transmittance characteristics of the liquid crystal display according to the second embodiment.

The liquid crystal display according to a second embodiment of the present invention will be explained with reference to FIGS. 7 to 9. FIG. 7 is a diagrammatic sectional view of the liquid crystal display according to the present embodiment. FIG. 8 is a plan view of a picture element electrode of the liquid crystal display according to the present embodiment. FIG. 9 is a graph of the result of simulation of transmittance characteristics of the liquid crystal display according to the present embodiment. The same members of the present embodiment as those of the liquid crystal display according to the first embodiment shown in FIGS. 1 to 6 are represented by the same reference numbers not to repeat or to simplify their explanation.

The liquid crystal display according to the present embodiment is characterized in that the projections 28, 50 formed in the liquid crystal display according to the first embodiment are not formed, but slits 68, 70 are formed in place of the projections 28, 50 in the regions where the projections 28, 50 are formed.

As shown in FIGS. 7 and 8, in the liquid crystal display according to the present embodiment, the slits 68, 70 are formed respectively in the picture element electrodes 26a and the counter electrode 48a. The slits 68, 70 are for aligning the liquid crystal molecules 64 in prescribed directions, as do the projections 28, 50. Electric fields extended from the slits 68, 70 align the liquid crystal molecules in prescribed directions.

According to the present embodiment, the slits 68, 70 are formed respectively in the picture element electrodes 26a and the counter electrode 48a, whereby electric fields extended from the slits 68, 70 align the liquid crystal molecules 64 in prescribed directions. According to the present embodiment, it is not necessary to form the projections 28, 50, as is in the first embodiment, which can simplify the fabrication process.

Then, display characteristics of the liquid crystal display according to the present embodiment will be explained with reference to FIG. 9. FIG. 9 is a graph of the result of a simulation of transmittance characteristic of the liquid crystal display according to the present embodiment.

As shown in FIG. 9, in the present embodiment, the region with the picture element electrodes 26a and the counter electrode 48a opposed to each other, which is other than a region with the slits 68 provided thereon, has substantially uniform transmittance characteristics without disclinations.

Thus, according to the present embodiment, the slits are formed in the picture element electrodes and the counter electrode, which can simplify the fabrication process.

A Third Embodiment

Figure 10:
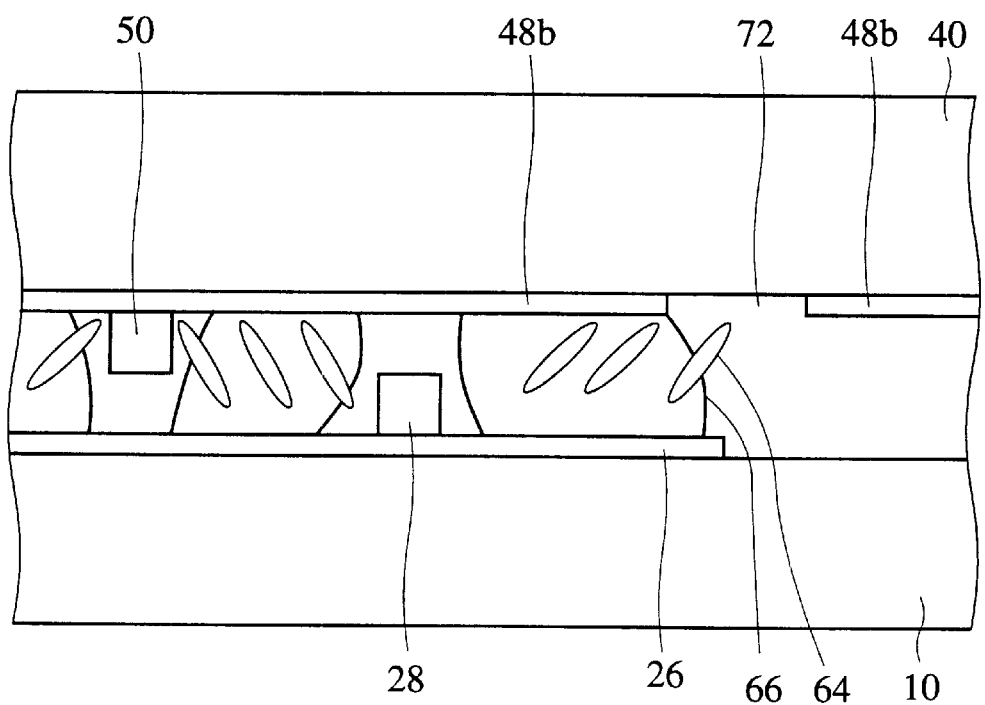
FIG. 10 is a diagrammatic sectional view of the liquid crystal display according to a third embodiment of the present invention.
Figure 11:
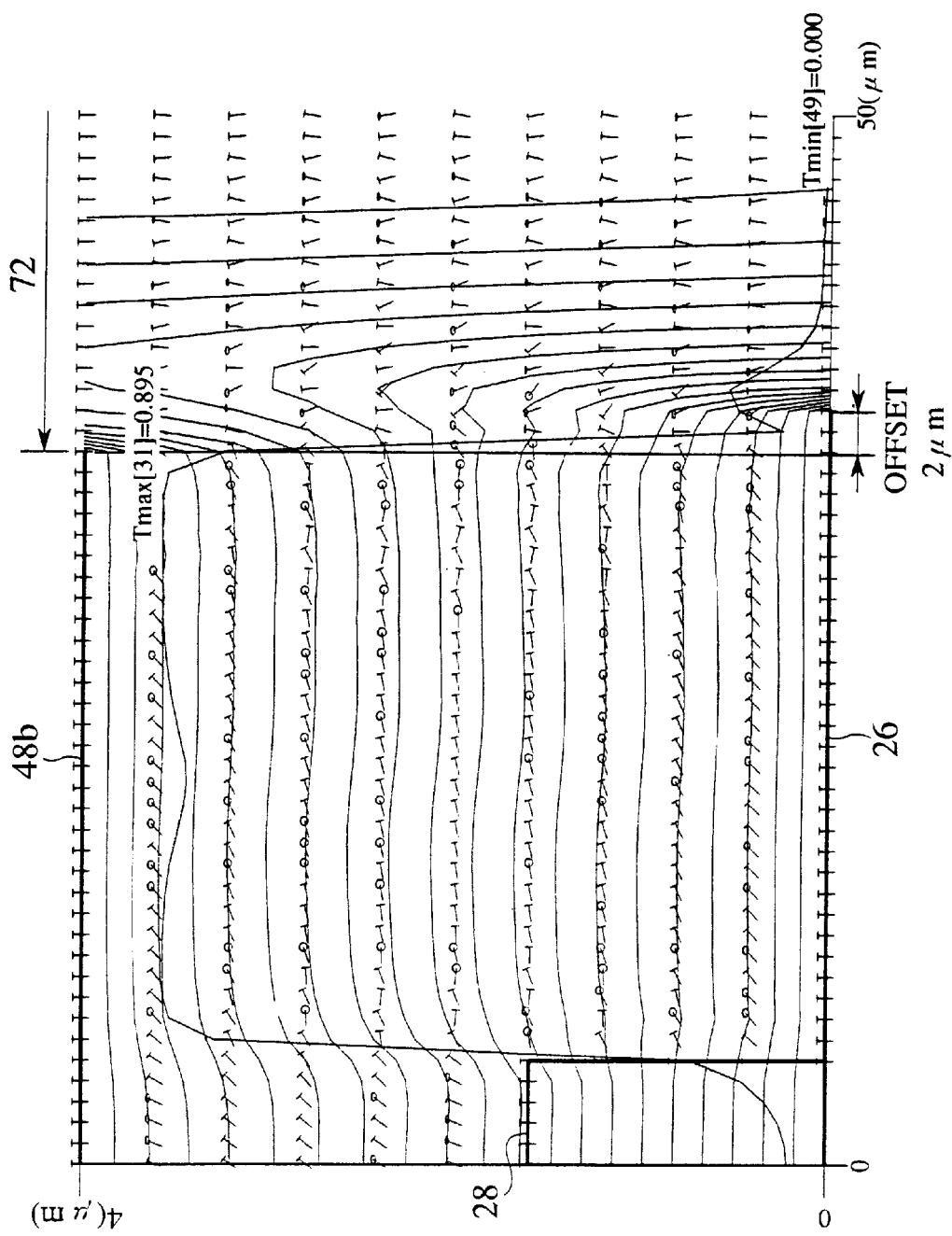
FIG. 11 is a graph of the result of a simulation of transmittance characteristics of the liquid crystal display according to the third embodiment of the present invention (Part 1).
Figure 12:
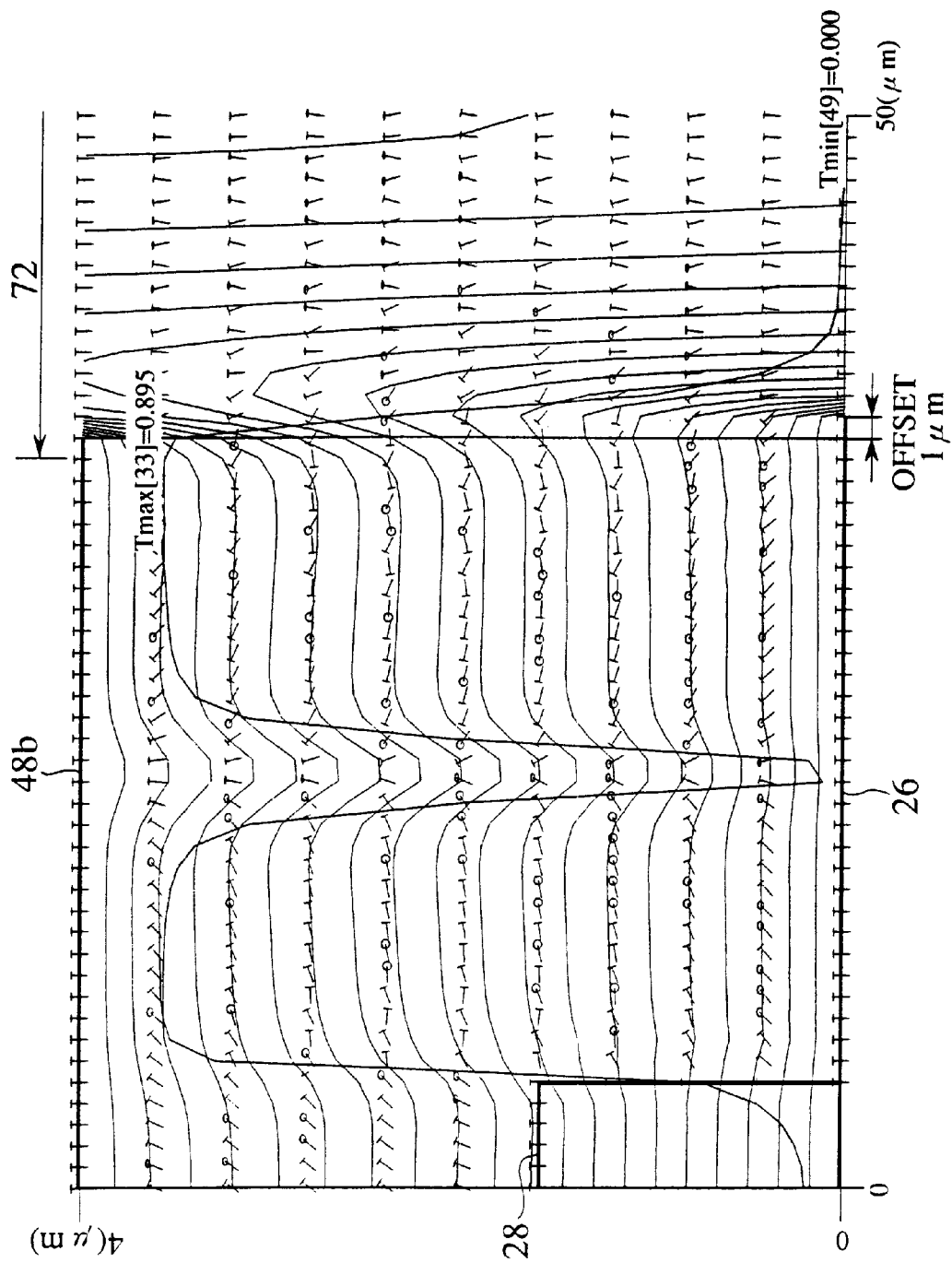
FIG. 12 is a graph of the result of a simulation of transmittance characteristics of the liquid crystal display according to the third embodiment of the present invention (Part 2).

The liquid crystal display according to a third embodiment will be explained with reference to FIGS. 10 to 12. FIG. 10 is a diagrammatic sectional view of the liquid crystal display according to the present embodiment. FIGS. 11 and 12 are graphs of the results of simulations of transmittance characteristics of the liquid crystal display according to the present embodiment. The same members of the present embodiment as those of the liquid crystal display according to the first or the second embodiment shown in FIGS. 1 to 9 are represented by the same reference numbers not to repeat or to simplify their explanation.

The liquid crystal display according to the present embodiment is characterized in that the cavities 62 formed in the glass substrate 40 of the first embodiment are not formed, but in place of the cavities 62, slits 72 are provided on the side of a counter electrode 48b in the vicinity of the end portions of picture element electrodes 26.

According to the present embodiment, the slits 72 are provided on the side of the counter electrode 48b in the vicinity of the end portions of the picture element electrodes 26, whereby extension of electric fields outward from the vicinity of the end portions of the picture element electrodes 26 can be suppressed, as can be in the first embodiment having the cavities 62 formed in the glass substrate 40.

The slits 72 may be formed only in regions where abnormal domains tend to occur.

Then, display characteristics of the liquid crystal display according to the present embodiment will be explained with reference to FIG. 11. FIG. 11 is a graph of display characteristics of a case that an offset, i.e., a length over which region with a slit 72 formed therein and a picture element electrode 26 overlap each other is 2 μm. FIG. 12 is a graph for a case that an offset is 1 μm.

Figure 28:
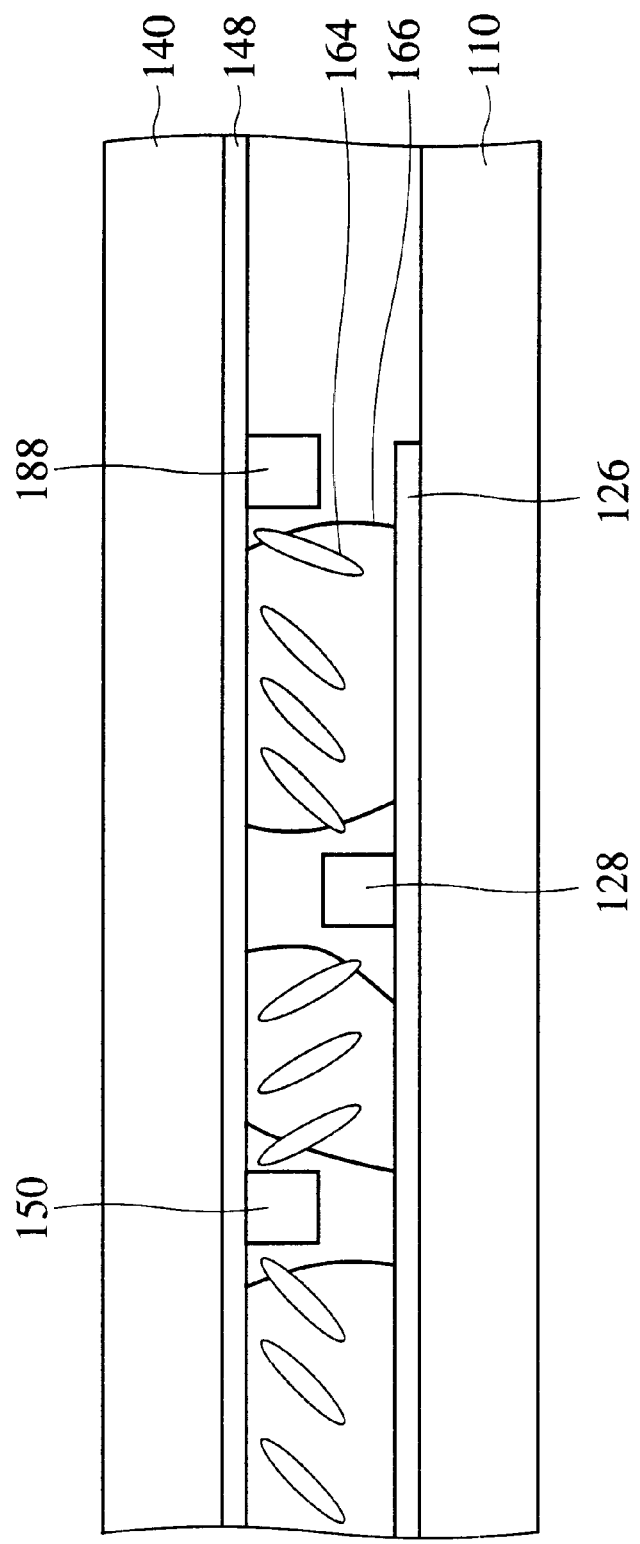
FIG. 28 is a diagrammatic sectional view of the proposed liquid crystal display.
Figure 29:
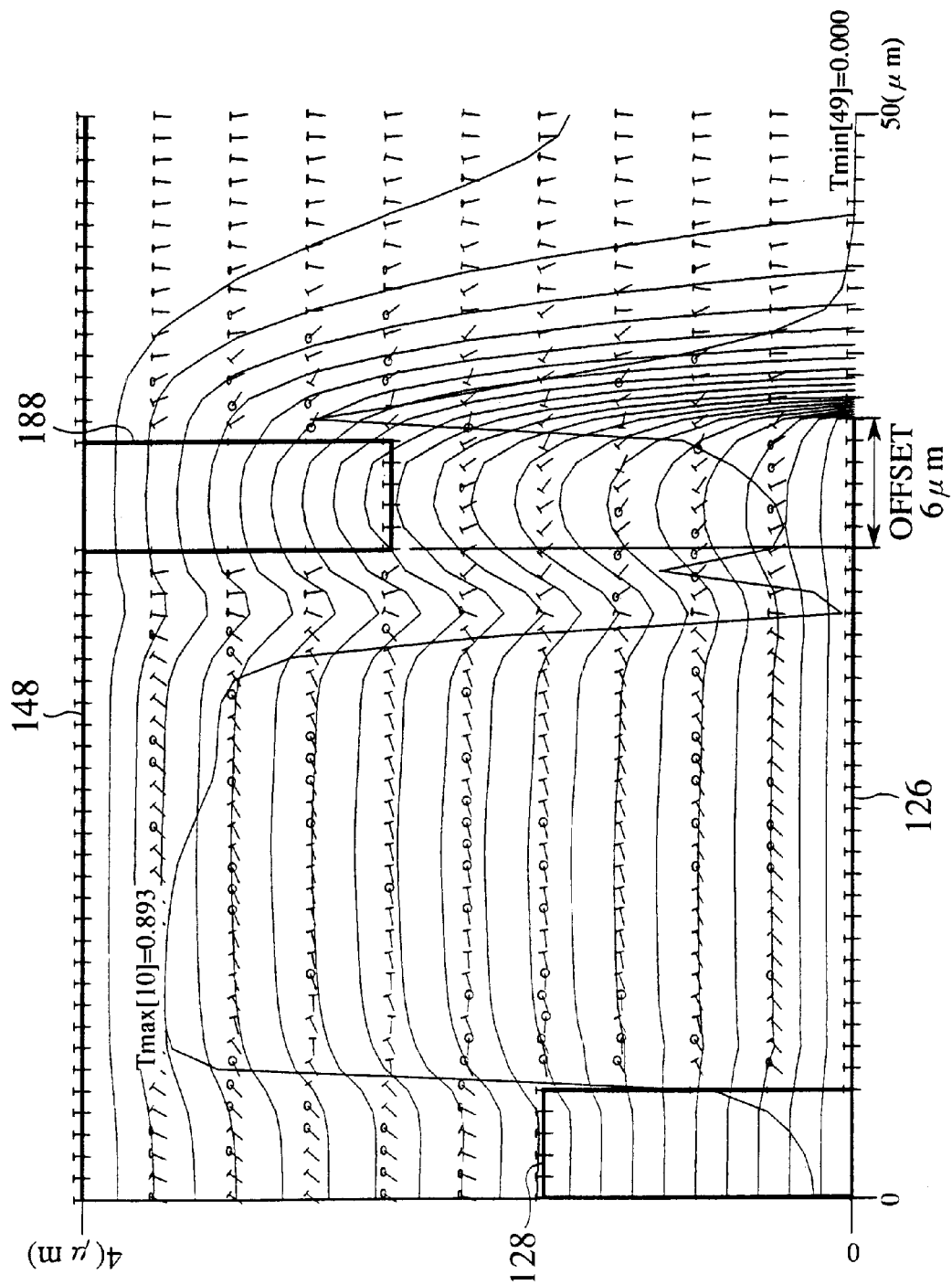
FIG. 29 is a graph of the result of the simulation of transmittance characteristics of the proposed liquid crystal display (Part 1).
Figure 30:
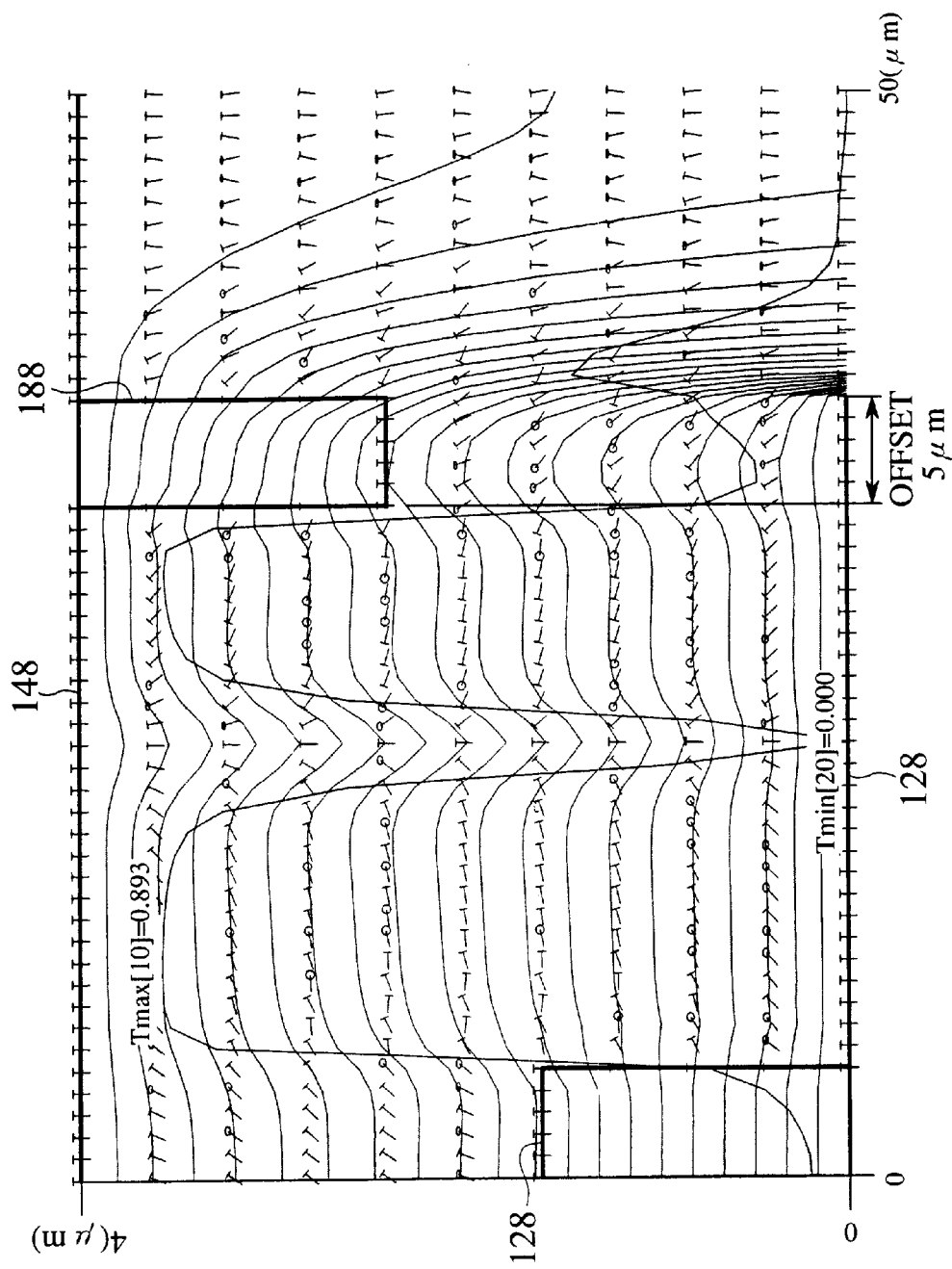
FIG. 30 is a graph of the result of the simulation of transmittance characteristics of the proposed liquid crystal display (Part 2).
Figure 31:
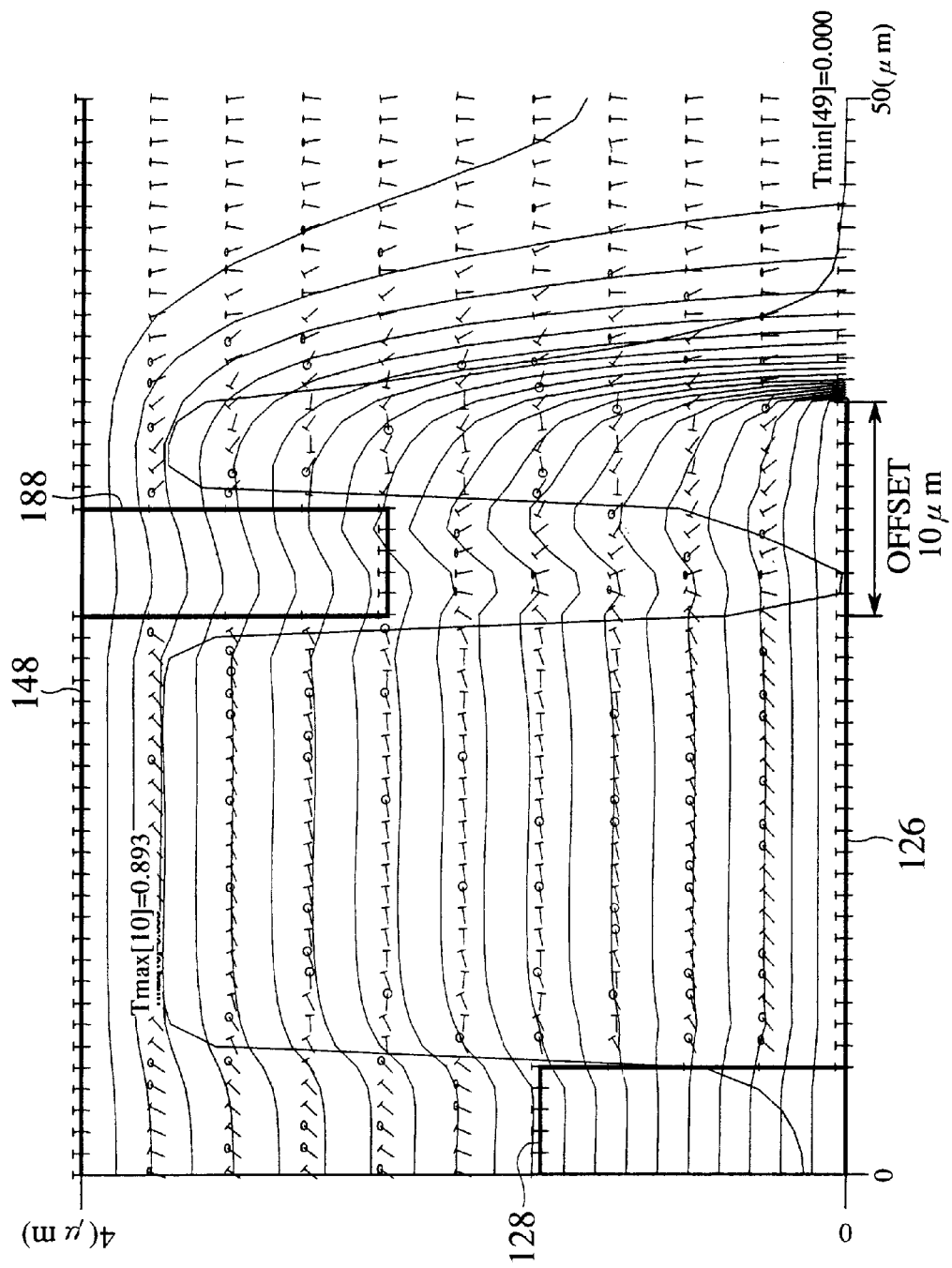
FIG. 31 is a graph of the result of the simulation of transmittance characteristics of the proposed liquid crystal display (Part 3).

In the proposed liquid crystal display shown in FIG. 28, when an offset was 5 μm, disclinations undesirably occur (see FIG. 30). When an offset was 6 μm, no disclination occurred (see FIG. 29).

In contrast to this, in the liquid crystal display according to the present embodiment, when an offset was 1 μm, disclinations undesirably occur, but no disclination occurred when an offset was 2 μm. In the present embodiment, because of the slits 72 formed in the counter electrode 48b, the picture element electrode 26 and the counter electrode 48b are opposed to each other at a decreased area, but an offset may be about 2 μm. In comparison with the liquid crystal display shown in FIG. 28, which requires an about 6 μm offset, the liquid crystal display according to the present embodiment can have higher luminance.

A Fourth Embodiment

Figure 13:
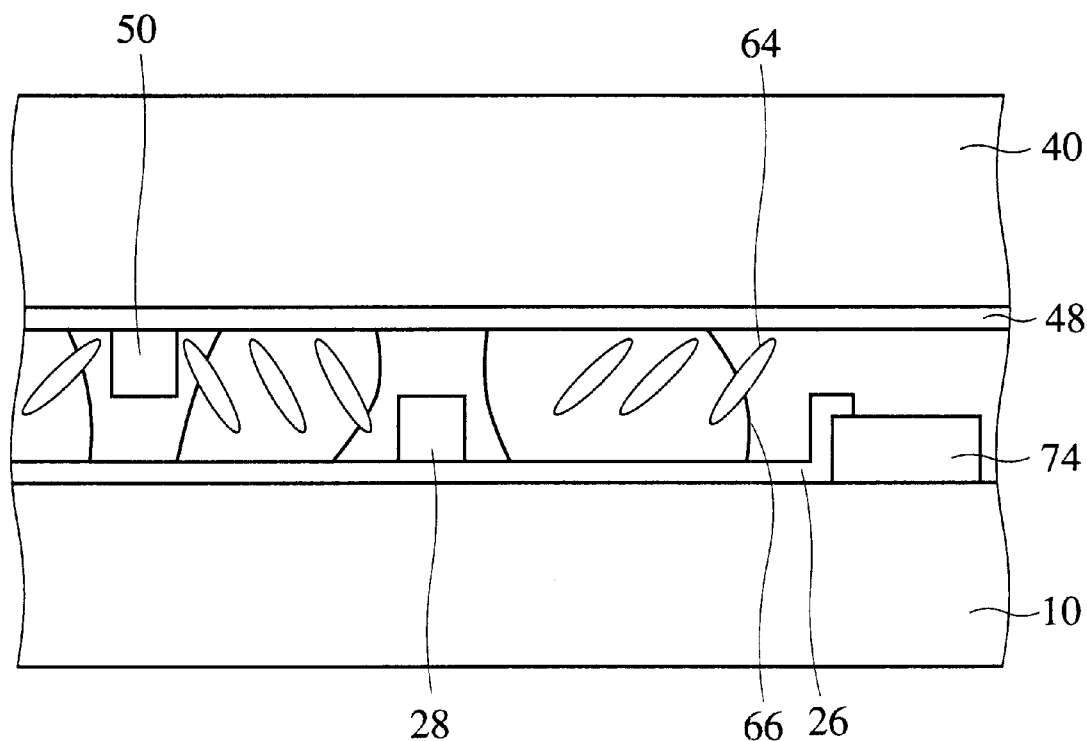
FIG. 13 is a diagrammatic sectional view of the liquid crystal display according to a fourth embodiment of the present invention.
Figure 14:
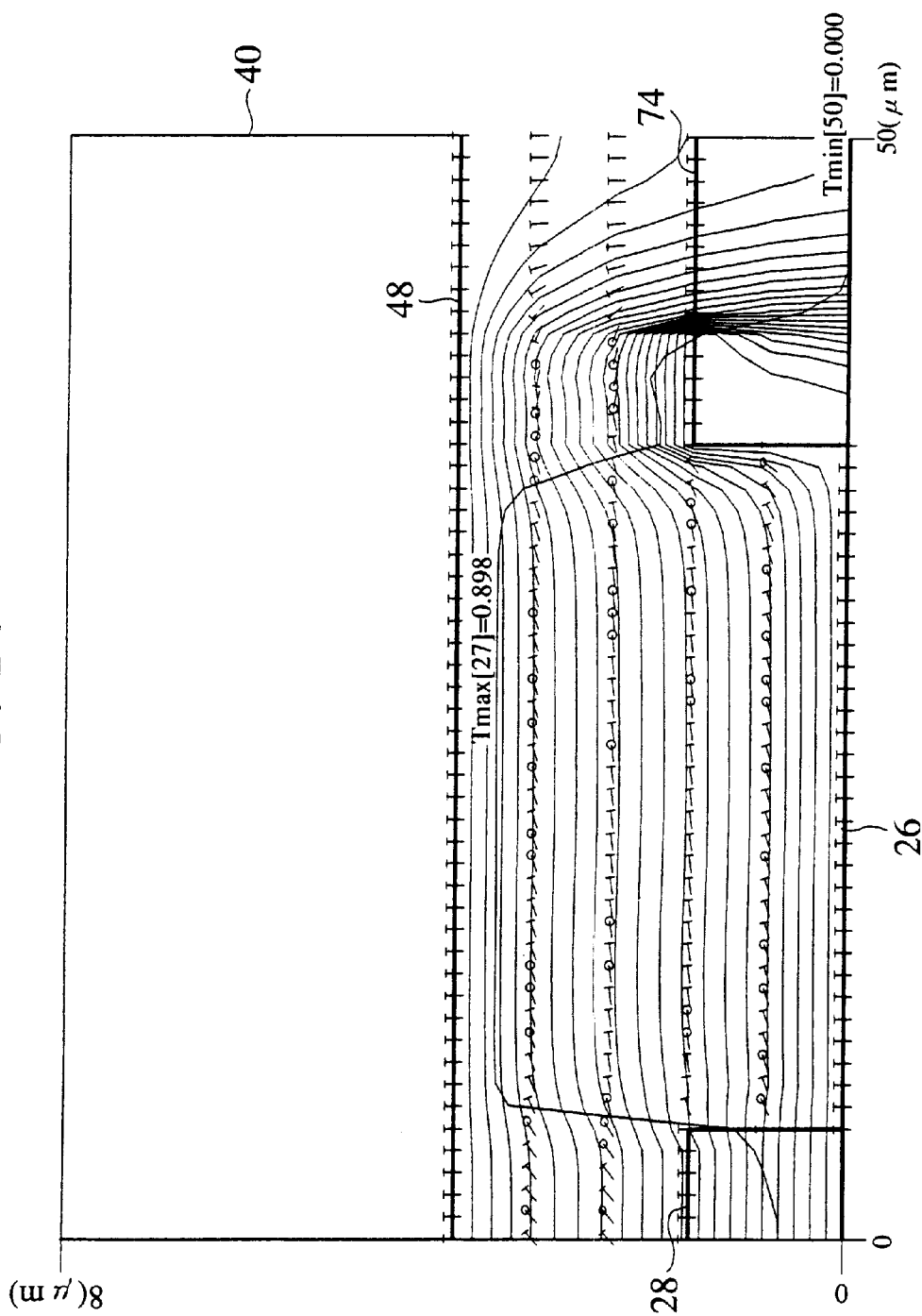
FIG. 14 is a graph of the result of a simulation of transmittance characteristics of the liquid crystal display according to the fourth embodiment of the present invention.

The liquid crystal display according to a fourth embodiment of the present invention will be explained with reference to FIGS. 13 and 14. FIG. 13 is a diagrammatic sectional view of the liquid crystal display according to the present embodiment. FIG. 14 is a graph of the result of a simulation of transmittance characteristics of the liquid crystal display according to the present embodiment. The same members of the present embodiment as those of the liquid crystal display according to the first to the third embodiment of the present invention are represented by the same reference numbers not to repeat or to simplify their explanation.

The liquid crystal display according to the present embodiment is characterized mainly in that convexities 74 of an insulation film are formed in the vicinity of the end portions of picture element electrodes 26, and end portions of the picture element electrodes 26 are extended over the convexities 74.

According to the present embodiment, the end portions of the picture element electrodes 26 are extended over the convexities 74 with the end portions bent toward a counter electrode 48, and a distance between the end portions of the picture element electrodes 26 and the counter electrode 48 is accordingly smaller, whereby extension of electric fields outward from the vicinity of the end portions of the picture element electrodes 26 can be prevented.

The convexities 74 may be formed only in regions where abnormal domains tend to occur.

Then, transmittance characteristics of the liquid crystal display according to the present embodiment will be explained with reference to FIG. 14.

As shown in FIG. 14, in the present embodiment, the region with the picture element electrodes opposed to the counter electrode, which is other than a region where the projections 28 and the convexities 74 are formed, has a substantially uniform transmittance without disclinations.

As described above, according to the liquid crystal display according to the present embodiment, end portions of the picture element electrodes are bent along the convexities, and a distance between the end portions of the picture element electrodes and the counter electrode is smaller, whereby extension of electric fields outward from the vicinity of the end portions of the picture element electrodes can be prevented.

Modification

Figure 15:
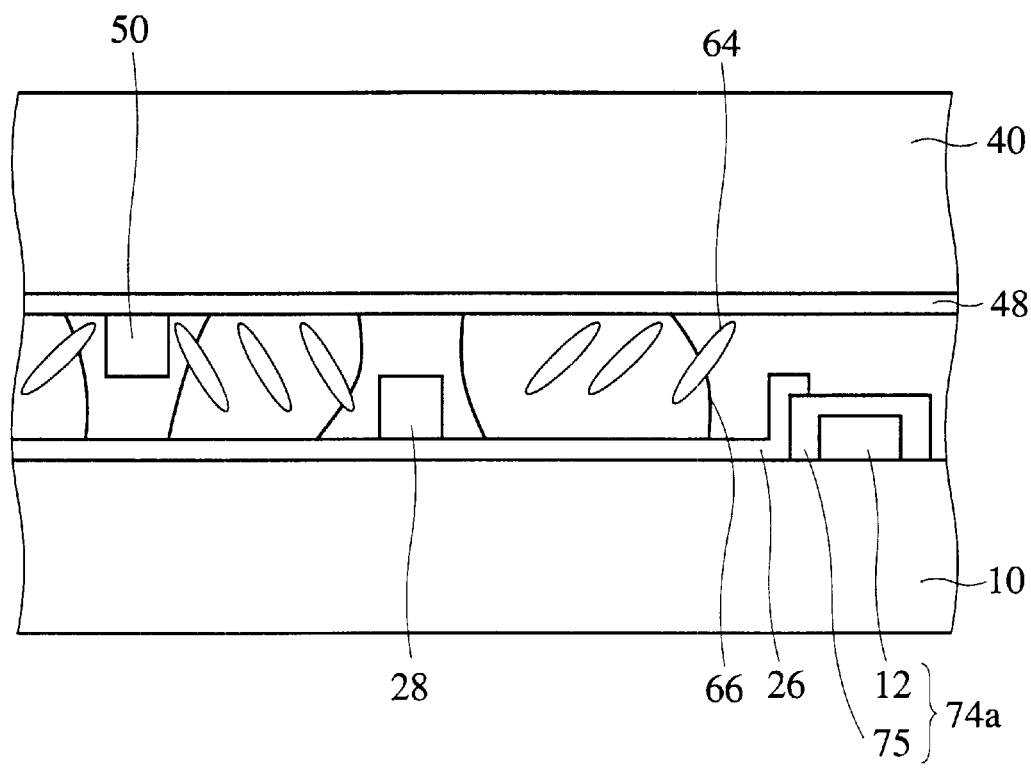
FIG. 15 is a diagrammatic sectional view of the liquid crystal display according to a modification of the fourth embodiment of the present invention.

Then, a modification of the liquid crystal display according to the present embodiment will be explained with reference to FIG. 15. FIG. 15 is a diagrammatic sectional view of the liquid crystal display according to the present modification.

As shown in FIG. 15, the liquid crystal display according to the present modification is mainly characterized in that convexities 74a are each formed of a CS electrode 12 and an insulation film 75 covering the CS electrode 12.

As in the present modification, a distance between end portions of the picture element electrodes 26 and a counter electrode 48 can be smaller also in a case that the convexities 74a are each formed of the CS electrode 12 and the insulation film 75 covering the CS electrode 12, whereby extension of electric fields outward from the vicinity of the end portions of the picture element electrodes can be prevented. Accordingly, disclinations can be suppressed, and the liquid crystal display can have high luminance.

A Fifth Embodiment

Figure 16:
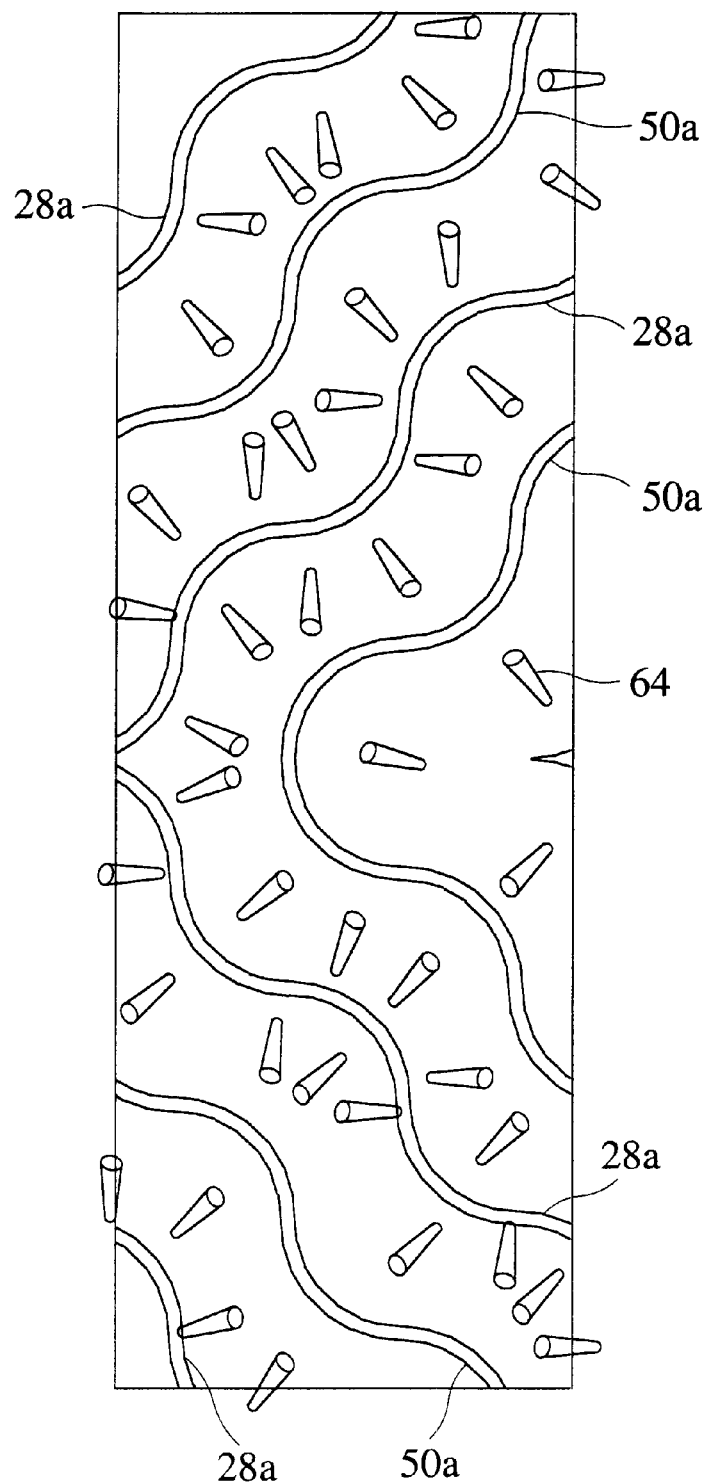
FIG. 16 is a plan view of a pattern of projections provided in the liquid crystal display according to a fifth embodiment of the present invention.

The liquid crystal display according to a fifth embodiment of the present invention will be explained with reference to FIG. 16. FIG. 16 is a plan view of a pattern of projections formed in the liquid crystal display according to the present embodiment. The same members of the present embodiment as those of the liquid crystal display according to the liquid crystal display according to the first to the fourth embodiments shown in FIGS. 1 to 15 are represented by the same reference numbers not to repeat or to simplify their explanation.

Figure 32A:
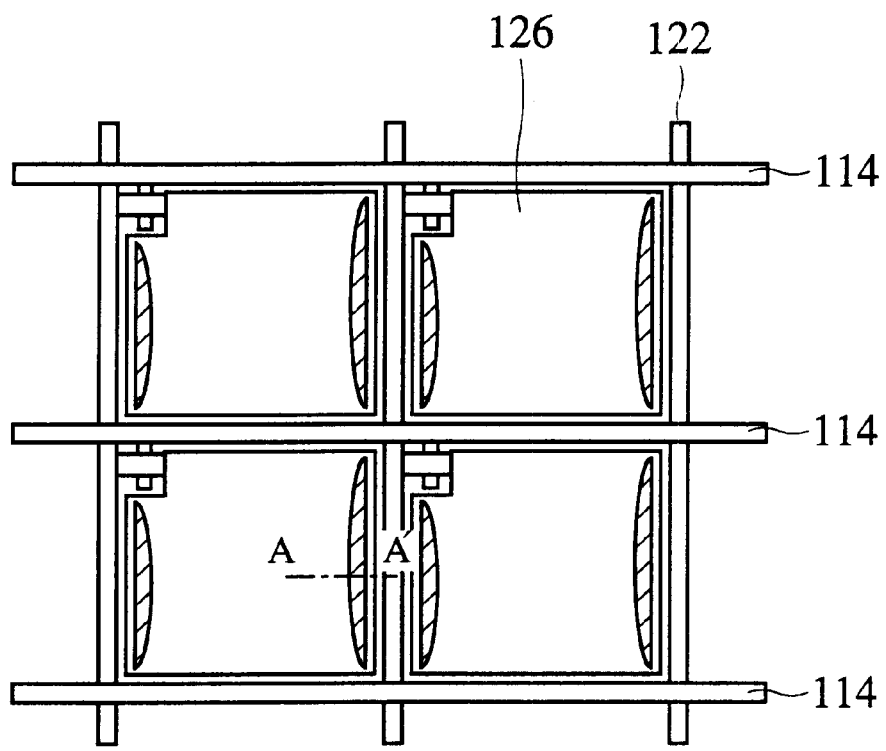
FIG. 32 is diagrammatic views of the conventional liquid crystal display.
Figure 32B:
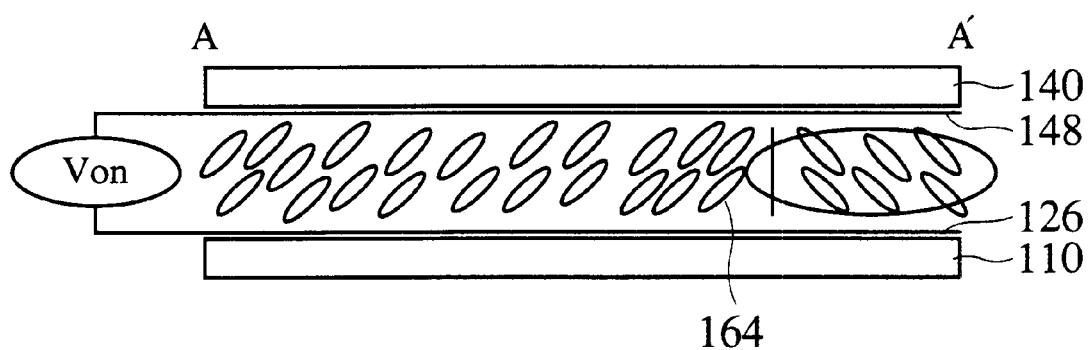

In the conventional liquid crystal display shown in FIG. 32, abnormal domains intensely occur in the shaded region, which significantly disturbs alignment directions of the liquid crystal molecules. The projections 128, 150 are extended at 45° to the direction of extension of the bus lines, which makes viewing angle characteristics that are not omnidirectionally the same and are inferior, especially in the direction which is about 45° to the bus lines.

As shown in FIG. 16, the liquid crystal display according to the present embodiment is characterized in that projections 28a, 50a are not extended in one direction, but are respectively extended continuously in different directions.

The projections 28a are formed on picture element electrodes 26, and the projections 50a are formed on a counter electrode 48. The projections 28a, 50a can have, e.g., a 10 μm width and a 1.5 m height. In the present embodiment, the projections 28a, 50a are not extended in one direction, but are respectively extended sinuously and continuously, whereby alignment directions of the liquid crystal molecules 64 are omnidirectional.

In the present embodiment, the projections 28a, 50a are formed so that alignment directions of the liquid crystal molecules 64 substantially agree with electric field directions in regions where abnormal domains tend to occur, i.e., between the drain bus lines 22 and the picture element electrodes 26 and between the gate bus lines 14 and the picture element electrodes 26. The directions of electric fields substantially agree with alignment directions of the crystal molecules, whereby occurrence of disclinations can be suppressed. The liquid crystal display can have accordingly high luminance.

According to the present embodiment, the projections 28a, 50a are not extended in one direction, but are respectively extended continuously in different directions, whereby alignment directions of the liquid crystal molecules can be omnidirectional, and good viewing angle characteristics can be omnidirectionally obtained.

According to the present embodiment, the liquid crystal molecules are omnidirectionally aligned evenly, so that inexpensive polarization plates widely used in liquid crystal displays of TN type can be used, which contributes to cost reduction of the liquid crystal display.

Modification

Figure 17:
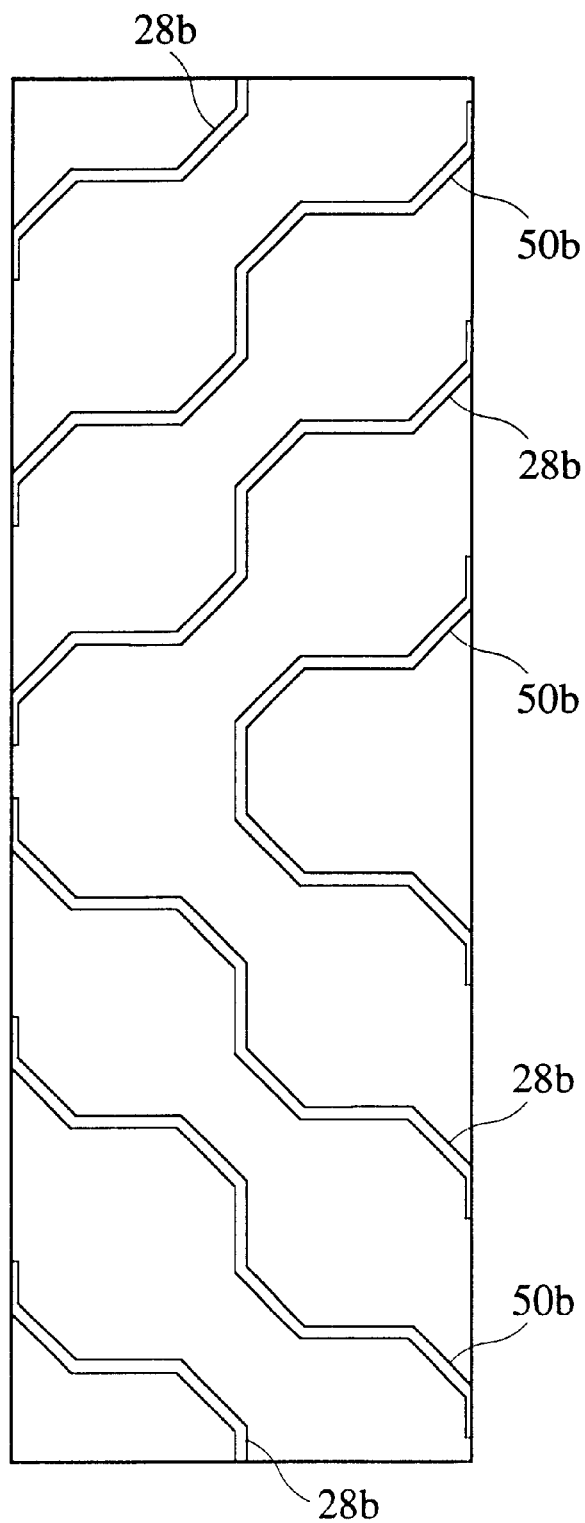
FIG. 17 is a plan view of a pattern of projections provided in the liquid crystal display according to a modification of the fifth embodiment of the present invention.

Next, a modification of the liquid crystal display according to the present embodiment will be explained with reference to FIG. 17. FIG. 17 is a plan view of a pattern of projections used in the liquid crystal display according to the present modification.

In the liquid crystal display according to the present modification, the projections 28b, 50b are formed as shown in FIG. 17. The projections 28b are formed on picture element electrodes 26, and the projections 50b are formed on a counter electrode 48. The projections 28b, 50b can have, e.g., a 10 μm-width and a 1.5 μm-height. The projections 28b, 50b are respectively combinations of linear patterns which form 45° to the bus lines, and linear patterns which form 90° to the bus lines.

In the present embodiment, the projections 28b, 50b are formed so that alignment directions of the liquid crystal molecules 64 substantially agree with electric field directions in regions where abnormal domains tend to occur, i.e., between the drain bus lines 22 and the picture element electrodes 26 and between the gate bus lines 14 and the picture element electrodes 26. The directions of electric fields substantially agree with alignment directions of the crystal molecules, whereby occurrence of disclinations can be suppressed. Accordingly, according to the present modification, as can in the fifth embodiment, occurrence of disclinations can be suppressed, and viewing angle characteristics can be omnidirectionally good.

A Sixth Embodiment

The liquid crystal display according to a sixth embodiment of the present invention will be explained with refernce to FIGS. 18 to 20. FIG. 18 is a plan view and operational conceptual views of the liquid crystal display according to the present embodiment, which shows a method for fabricating the liquid crystal display. FIG. 20 is a graph of relationship between UV radiation application amounts and pre-tilt angles. The same members of the present embodiment as those of the liquid crystal display according to the first to the fifth embodiments shown in FIGS. 1 to 17 are represented by the same reference numbers not to repeat or to simplify their explanation.

Figure 18A:
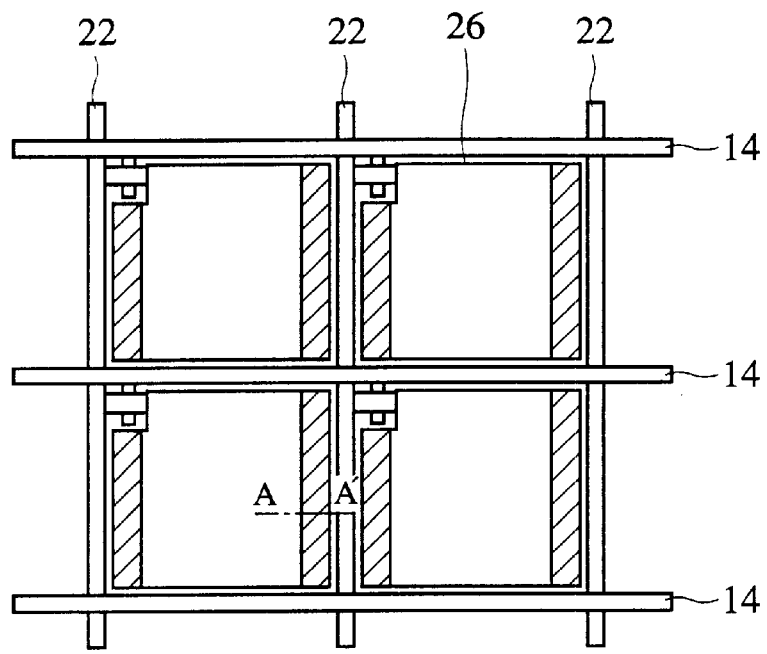
FIG. 18 is a plan view and operational conceptual views of the liquid crystal display according to a sixth embodiment of the present invention.

The liquid crystal display according too the present embodiment is characterized mainly in that UV radiation is intensely applied to a region where abnormal domains tend to take place, i.e., the shaded parts in FIG. 18A, so as to make a pre-tilt angle of the liquid crystal molecules smaller, whereby display characteristics of the liquid crystal display are improved. In the specification of the present application, a pre-tilt angle is indicated with the horizontal direction of the substrate set as 0°.

Figure 18B:
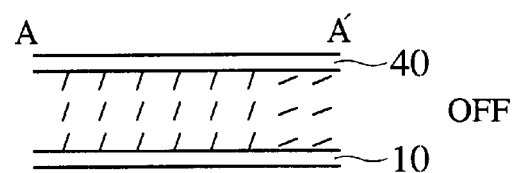
Figure 18C:
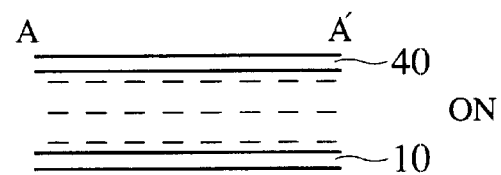

FIGS. 18B and 18C are sectional views along the line A–A' in FIG. 18A. FIG. 18B shows a state where a TFT is OFF, i.e., a voltage is applied between picture element electrodes and a counter electrode. FIG. 18C shows a state where a TFT is ON, i.e., no voltage is applied between the picture element electrodes and the counter electrode.

As shown in FIG. 18B, in a region to which UV radiation has been intensely applied the pre-tilt angle of the liquid crystal molecules is smaller. Because of the smaller pre-tilt angle in the regions where abnormal domains tend to take place, occurrence of disclinations can be suppressed even when a large potential difference take place between the picture element electrodes and the bus lines.

Then, the method for fabricating the liquid crystal display according to the present embodiment will be explained with reference to FIG. 19.

Figure 19:
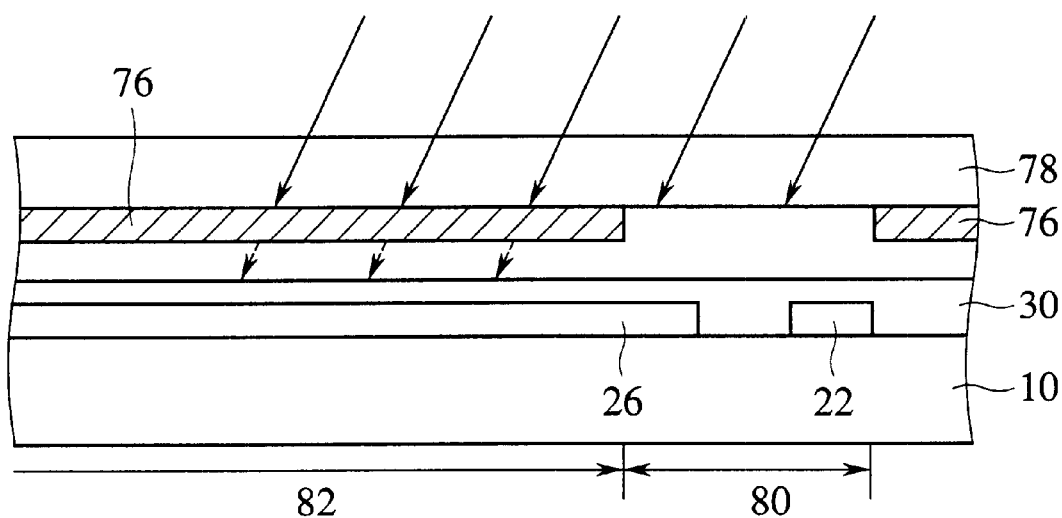
FIG. 19 is a sectional view of the liquid crystal display according to the sixth embodiment, which shows the method for fabricating the liquid crystal display.
Figure 20:
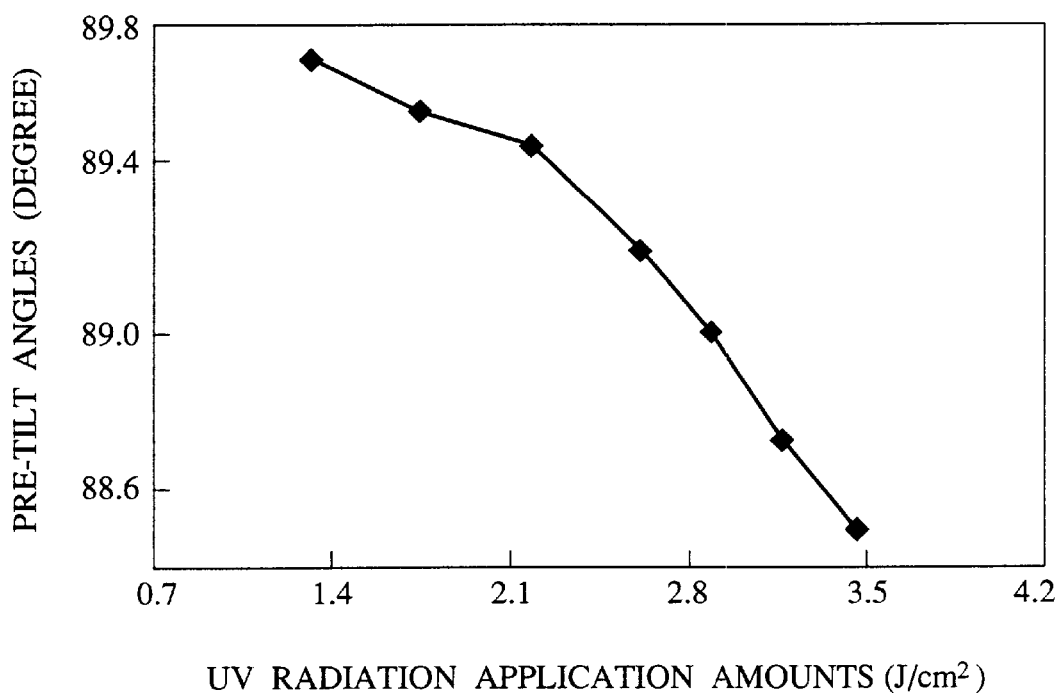
FIG. 20 is a graph of relationships between UV radiation application amounts and pre-tilt angles.

A TFT substrate with an alignment film formed thereon as shown in FIG. 19 is prepared.

Then, UV radiation is applied to the alignment film 30, using a mask 78 having a shield film 76 formed of a chrome film of, e.g., 50% UV radiation transmittance thereon. The shield film 76 is formed in the region except the regions 80 where abnormal domains tend to take place. Because of the shield film formed in the region except the regions 80 where abnormal domains tend to occur, UV radiation is applied to the regions 80 where abnormal domains tend to occur in an application amount twice that for the region 82 where abnormal domains do not easily take place. A pre-tilt angle of the liquid crystal molecules can be made smaller on the alignment film 30 of the regions to which UV radiation has been intensely applied to, whereby disclinations cannot easily take place there. The alignment film 30 can be formed of a vertical alignment material produced by JSR Co., Ltd., or others.

As a condition for applying the UV radiation, the UV radiation is applied at, e.g., 45° to the substrate face. A pre-tilt angle of the liquid crystal molecule angle is determined by applying the UV radiation diagonally to the substrate face, but when an incident angle of the UV radiation to the substrate face is too small, an effective application amount is small, and the exposure accordingly takes time. An incident angle of the UV radiation to the substrate face is about 45°, whereby a required pre-tilt angle can be effectively set.

An application amount of the UV radiation can be, e.g., 29 mW/cm$^2$ for 60 seconds. In the graph of FIG. 20, UV application amounts are taken on the horizontal axis, and pre-tilt angles are taken on the vertical axis. As shown in FIG. 20, there is a tendency that with the UV application amount increases, the pre-tilt angle becomes smaller. Accordingly, it is preferable that a UV application amount is suitably set for a required pre-tilt angle.

As described above, according to the present embodiment, a pre-tilt angle is made smaller by applying intense UV radiation to the alignment film in the regions where abnormal domains tend to take place, occurrence of disclinations in the regions where abnormal domains tend to take place can be suppressed.

A Seventh Embodiment

The liquid crystal display according to a seventh embodiment of the present invention and the method for fabricating the liquid crystal display will be explained with reference to FIGS. 21 to 22. FIG. 21 is a plan view and operational conceptual views of the liquid crystal display according to the present embodiment. FIG. 22 is a sectional view of the liquid crystal display according to the present embodiment, which shows the method for fabricating the liquid crystal display. The same members of the present embodiment as those of the liquid crystal display according to the first to the sixth embodiments shown in FIGS. 1 to 20 are represented by the same reference numbers not to repeat or to simplify their explanation.

Figure 21A:
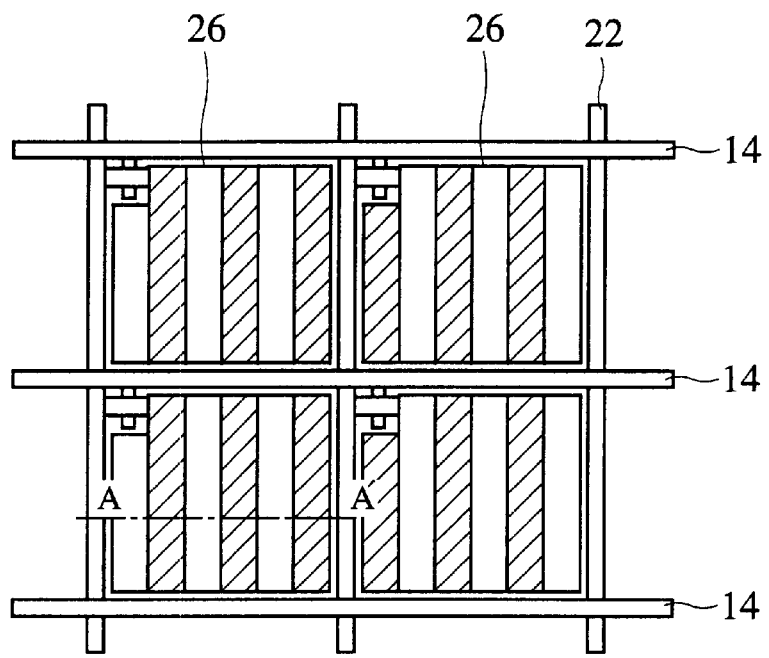
FIG. 21 is a plan view and operational conceptual views of the liquid crystal display according to a seventh embodiment of the present invention.
Figure 22:
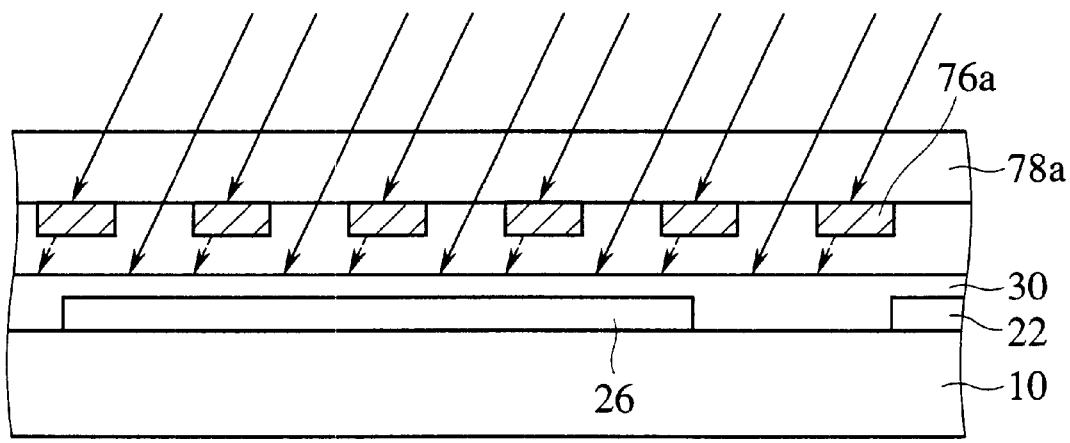
FIG. 22 is a sectional view of the liquid crystal display according to the seventh embodiment, which shows the method for fabricating the liquid crystal display.

The liquid crystal display according to the present embodiment is characterized mainly in that UV radiation is applied in a larger amount to the shaded regions in FIG. 21A so as to make a pre-tilt angle of the liquid crystal molecules smaller, whereby display characteristics of the liquid crystal display are improved.

Figure 21B:
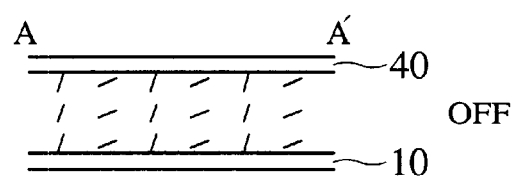
Figure 21C:
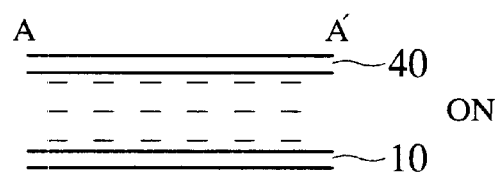

FIGS. 21B and 21C are sectional views along the line A–A' in FIG. 21A. FIG. 21B shows a state where a TFT is OFF, and FIG. 21C shows a state where a TFT is ON.

As shown in FIG. 21B, a pre-tilt angle of the liquid crystal molecules is smaller in the regions to which a larger amount of UV radiation has been applied. On the other hand, a pre-tilt angle is larger in the regions to which a smaller amount of UV radiation has been applied.

A pre-tilt angle of liquid crystal molecules can be generally set by application of UV radiation, and a required pre-tilt angle can be set by an application amount of the UV radiation. However, a pre-tilt angle can be tilted by about 1° from perpendicular with good reproducibility, but it is difficult to tilt a pre-tilt angle by more than 1° with good reproducibility.

In the liquid crystal display shown in FIG. 21, regions where a pre-tilt angle is smaller are arranged in stripes, which can make viewing angle characteristics generally good.

Thus, the method for fabricating the liquid crystal display according to the present embodiment will be explained with reference to FIG. 22.

A TFT substrate with an alignment film 30 formed on as shwon in FIG. 22 is prepared.

Then, by using a mask 78a with a shield film 76a formed in stripes as shown, UV radiation is applied to the alignment film 30. The shield film 76a can be provided by a shield film of, e.g., a 50% UV transmittance chrome film. A pitch of the stripes of the shield film 76a can be, e.g., 20 μm. The alignment film 30 is exposed to UV radiation by using the mask 78a with the shield film 76a formed on at a prescribed pitch, whereby the UV radiation is applied to regions without the shield film 76a at an intensity twice an intensity at which the UV radiation is applied to regions through the shield film 76a.

In the present embodiment, a pre-tilt angle is controlled in a pattern corresponding to the shield film formed in stripes, whereby stable display characteristics can be generally provided. The alignment film can be formed of a vertical alignment material produced by JSR Co., Ltd., or others. As a condition for applying the UV radiation, the UV radiation is applied at, e.g., 45° to the substrate face. It is preferable that an UV application amount can be suitably set so as to obtain a required pre-tilt angle.

As described above, according to the present embodiment, the UV radiation is applied by using as a mask the striped shield film, whereby generally stable display characteristics can be provided.

Modification

Figure 23:
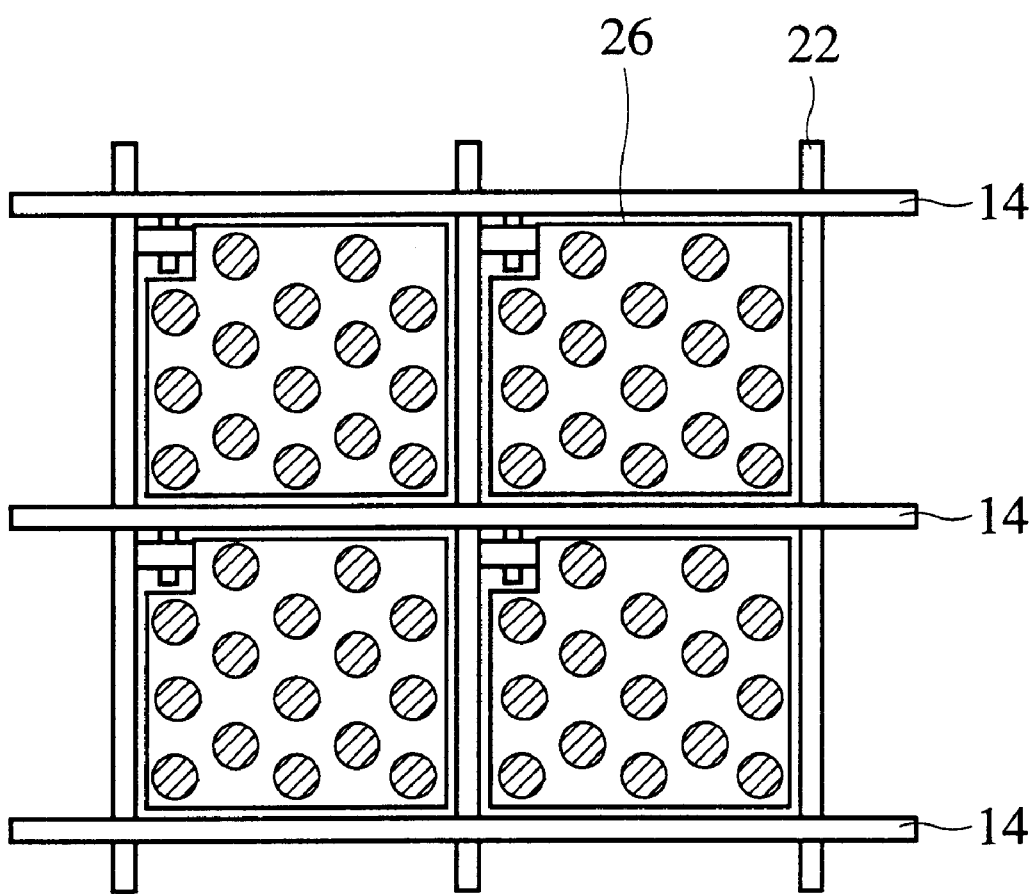
FIG. 23 is a diagrammatic plan view of the liquid crystal display according to a modification of the seventh embodiment of the present invention.

Next, a modification of the liquid crystal display according to the present embodiment will be explained with reference to FIG. 23. FIG. 23 is a diagrammatic plan view of the liquid crystal display according to the present modification.

The liquid crystal display according to the present modification is characterized mainly in that UV radiation is applied in a larger amount to the shaded regions in FIG. 23 so as to make a pre-tilt angle of the liquid crystal molecules smaller, whereby display characteristics of the liquid crystal display can be improved.

In the liquid crystal display according to the present modification, regions where a pre-tilt angle is smaller are distributed in dots, whereby viewing angle characteristics can be generally good.

Regions to which UV radiation is applied are not limited to a dot pattern, but may be, e.g., a matrix pattern, or others.

An Eight Embodiment

Figure 24:
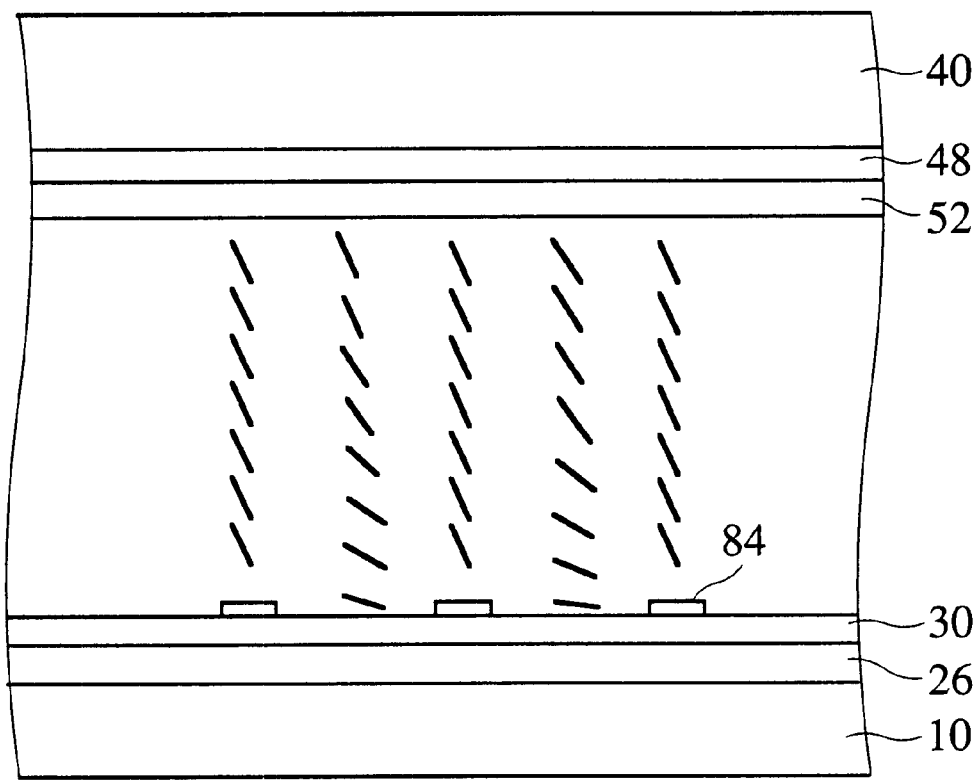
FIG. 24 is a diagrammatic sectional view of the liquid crystal display according to an eighth embodiment of the present invention.
Figure 25:
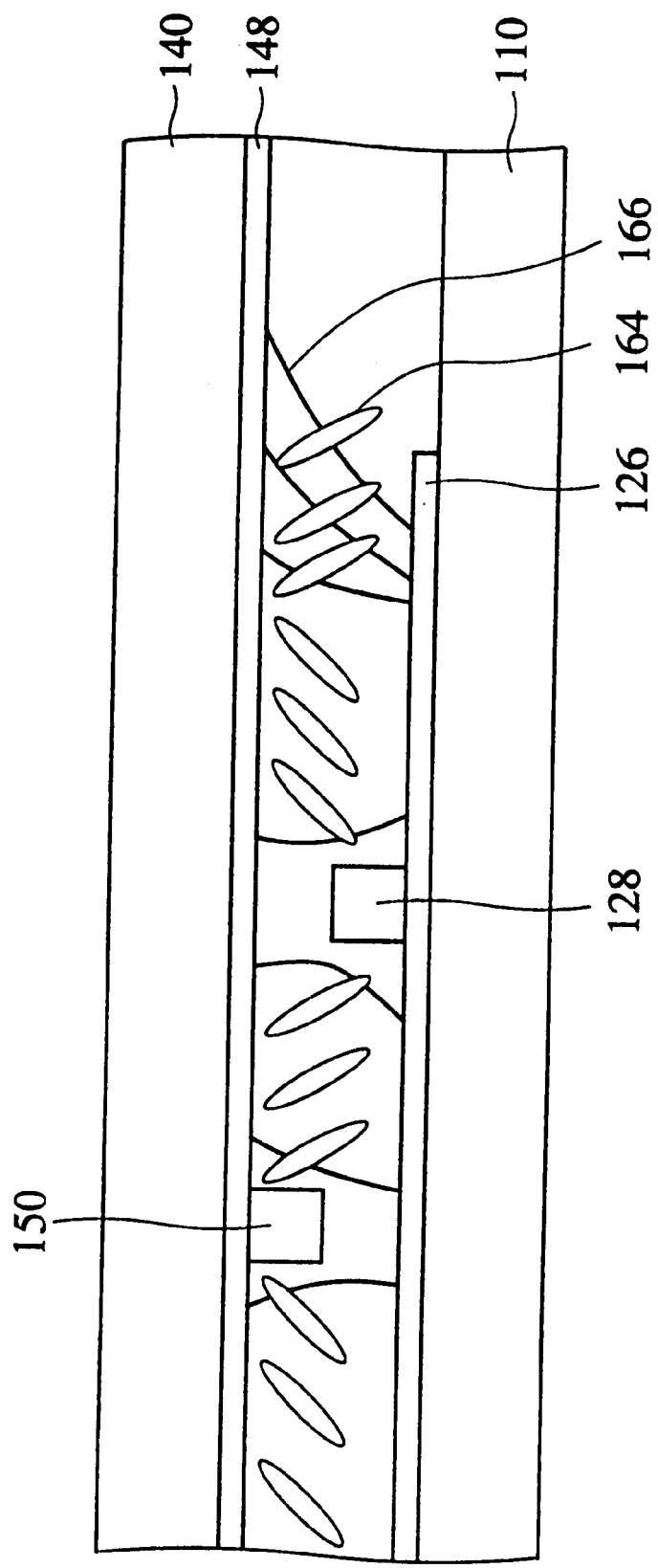
FIG. 25 is a diagrammatic sectional view of the conventional MVA mode-liquid crystal display.
Figure 26:
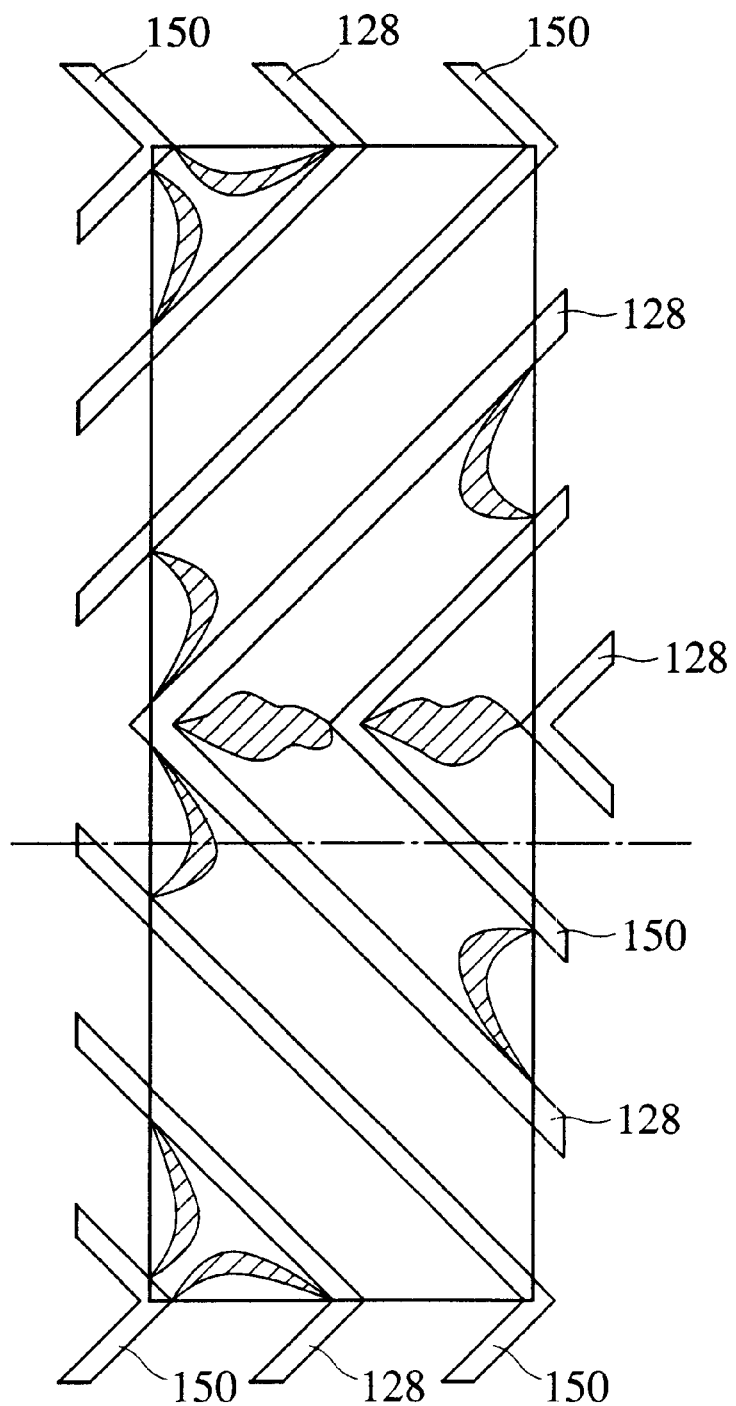
FIG. 26 is a conceptual view of occurrences of disclinations.
Figure 27:
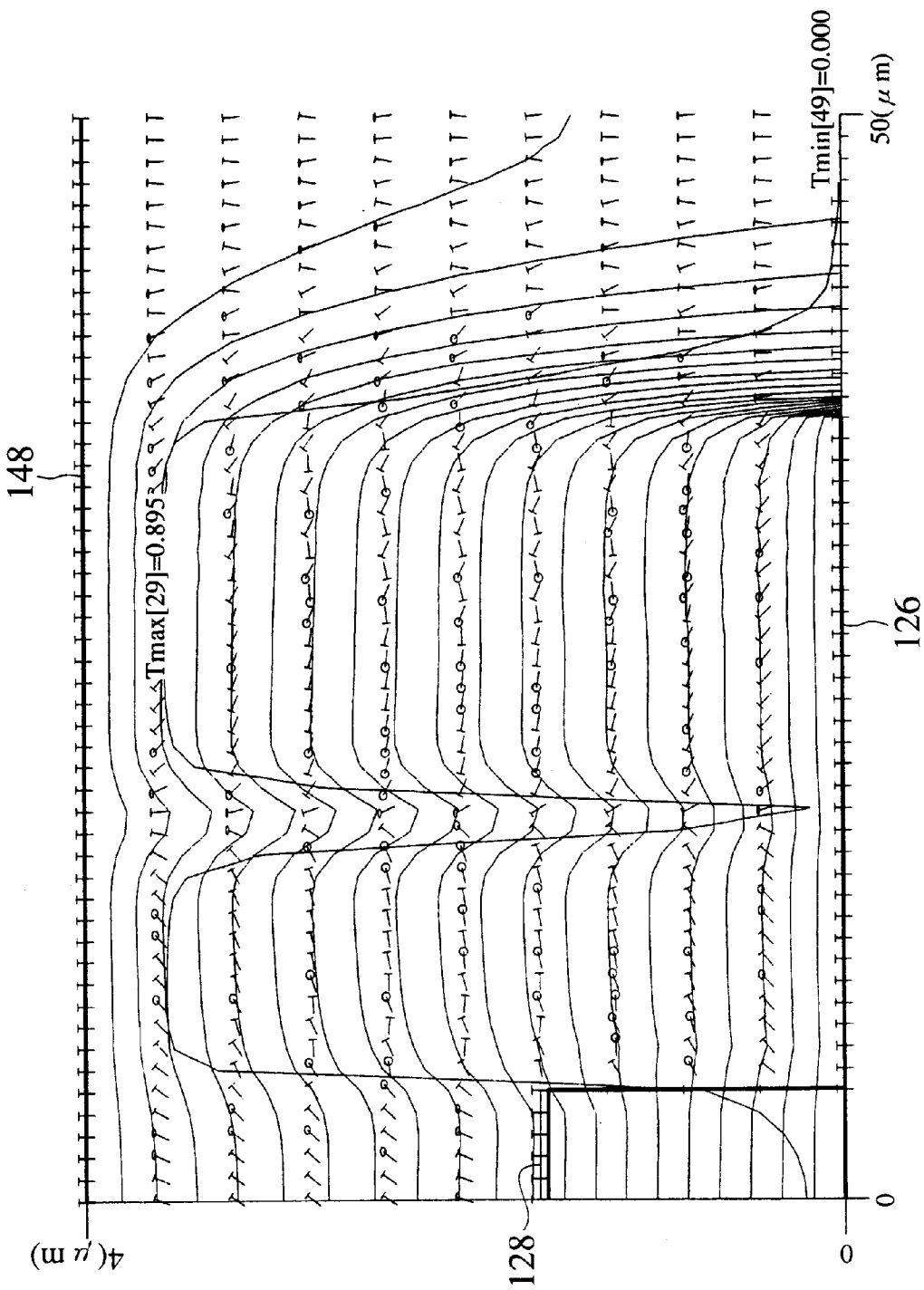
FIG. 27 is a graph of a result of a simulation of transmittance of the conventional MVA mode-liquid crystal display.

The liquid crystal display according to an eighth embodiment of the present invention will be explained with reference to FIG. 24. FIG. 24 is a diagrammatic sectional view of the liquid crystal display according to the present embodiment. The same members of the present embodiment as those of the liquid crystal display according to the first to the seventh embodiments shown in FIGS. 1 to 23 are represented by the same reference numbers not to repeat or to simplify their explanation.

The liquid crystal display according to the present embodiment is characterized mainly in that, as shown in FIG. 24, on an alignment film 30 with UV radiation applied to, another alignment film 84 is formed in stripes. The alignment films can be formed of a vertical alignment material produced by JSR Co., Ltd., or others. No UV radiation is applied to the striped alignment film 84.

As shown in FIG. 24, the liquid crystal molecules on the alignment film 30 with UV radiation applied to have a smaller pre-tilt angle, and liquid crystal molecules on the alignment film 84 without UV radiation applied to have a larger pre-tilt angle. Accordingly, generally stable display characteristics can be provided. As a condition for applying the UV radiation, the UV radiation is applied at, e.g., 45° to the substrate face. It is preferable to suitably set an UV application amount for a required pre-tilt angle.

As described above, according to the present embodiment, said another alignment film is formed on the alignment film with UV radiation applied to, whereby generally stable display characteristics can be provided.

Modified Embodiments

The present invention is not limited to the above-described embodiments and can cover other various modifications.

For example, in the first to the fifth embodiments, the present invention is applied to liquid crystal displays of MVA mode, but is applicable to liquid crystal displays of not only the MVA mode but also the TN mode of others.

In the fifth embodiment, the projections are continuously extended respectively in different directions. However, the projections are not essentially extended sinuously, and may be extended, e.g., in steps as long as extension directions continuously change.

In the fifth embodiment, the projections are formed, but slits may be formed in the same pattern as the projections.

In the eighth embodiment, another alignment film 84 is formed on the alignment film 30 on the side of the TFT substrate, but said another alignment film 84 may be formed on the alignment film 52 on the side of the CF substrate.

INDUSTRIAL APPLICABILITY

The present invention is suitable for the liquid crystal displays and the method for fabricating the liquid crystal displays, and especially useful for the liquid crystal displays of vertical alignment mode which controls tilt directions of the liquid crystal molecules upon application of a voltage, and the methods for fabricating the liquid crystal displays.

What is claimed is:

1. A liquid crystal display comprising a first substrate with a picture element electrode formed thereon, a second substrate with a counter electrode opposed to the picture element electrode, and a liquid crystal sealed between the first substrate and the second substrate, a distance between the picture element electrode and the counter electrode in a neighborhood of the end portion of the picture element electrode being larger than a distance between the picture element electrode and the counter electrode in a region except in the neighborhood of the end portion of the picture element electrode, wherein the neighborhood of the end portion of the picture element electrode is a region where a disuniformity of alignment directions of liquid crystal molecules tend to occur, in which the liquid crystal is a liquid crystal having negative dielectric anisotropy, and which further includes alignment control means for controlling an alignment direction of liquid crystal molecules.

2. A liquid crystal display according to claim 1, wherein the distance between the picture element electrode and the counter electrode in the neighborhood of the end portion of the picture element electrode is gradually increased toward a region where the picture element electrode and the counter electrode are not opposed to each other.

3. A liquid crystal display comprising a first substrate with a picture element electrode formed thereon, a second substrate with a counter electrode opposed to the picture element electrode, and a liquid crystal sealed between the first substrate and the second substrate, the counter electrode including a first slit in a region corresponding to a neighborhood of the end portion of the picture element electrode, wherein the neighborhood of the end portion of the picture element electrode is a region where a disuniformity of alignment directions of liquid crystal molecules tend to occur, and the first slit being formed along the end portion of the picture element electrode.

4. A liquid crystal display comprising a first substrate with a picture element electrode formed thereon, a second substrate with a counter electrode opposed to the picture element electrode, and a liquid crystal sealed between the first substrate and the second substrate, a distance between the picture element electrode and the counter electrode in a neighborhood of the end portion of the picture element electrode being smaller than a distance between the picture element electrode and the counter electrode in a region except in the neighborhood of the end portion of the picture element electrode, wherein the neighborhood of the end portion of the picture element electrode is a region where a disuniformity of alignment directions of liquid crystal molecules tend to occur, in which the liquid crystal is a liquid crystal having a negative dielectric anisotropy, and which further includes alignment control means for controlling an alignment direction of liquid crystal molecules.

5. A liquid crystal display according to claim 4, wherein the picture element electrode is formed, extended over a storage capacitor electrode formed on the first substrate, and the storage capacitor electrode decreases the distance between the neighborhood of the end portion of the picture element electrode and the counter electrode.

6. A liquid crystal display according to claim 3, in which the liquid crystal is a liquid crystal having negative dielectric anisotropy, and which further comprises alignment control means for controlling an alignment direction of liquid crystal molecules.

7. A liquid crystal display according to claim 1, wherein the alignment control means is a projection formed on the picture element electrode and/or the counter electrode, or a slit formed in the picture element electrode and/or the counter electrode.

8. A liquid crystal display according to claim 6, wherein the alignment control means is a projection formed on the picture element electrode and/or the counter electrode, or a second slit formed in the picture element electrode and/or the counter electrode.

9. A liquid crystal display according to claim 4, wherein the alignment control means is a projection formed on the picture element electrode and/or the counter electrode, or a slit formed in the picture element electrode and/or the counter electrode.

10. A liquid crystal display according to claim 7, wherein the alignment control means is extended continuously in different directions.

11. A liquid crystal display according to claim 8, wherein the alignment control means is extended continuously in different directions.

12. A liquid crystal display according to claim 9, wherein the alignment control means is extended continuously in different directions.

13. A liquid crystal display according to claim 7, further comprising
a bus line adjacent to the picture element electrode,
the alignment control means being formed so that an alignment direction of liquid crystal molecules is substantially vertical to the bus line in a prescribed region on the picture element electrode near the bus line.

14. A liquid crystal display according to claim 8, further comprising
a bus line adjacent to the picture element electrode,
the alignment control means being formed so that an alignment direction of liquid crystal molecules is substantially vertical to the bus line in a prescribed region on the picture element electrode near the bus line.

15. A liquid crystal display according to claim 9, further comprising
a bus line adjacent to the picture element electrode,
the alignment control means being formed so that an alignment direction of liquid crystal molecules is substantially vertical to the bus line in a prescribed region on the picture element electrode near the bus line.

16. A liquid crystal display comprising a picture element electrode, a first substrate including a first alignment film formed on the picture element electrode, a counter electrode opposed to the picture element electrode, a second substrate including a second alignment film formed on the counter electrode, and a liquid crystal sealed between the first substrate and the second substrate,
a pre-tilt angle of liquid crystal molecules aligned by the first or the second alignment film in a first region on the picture element electrode being smaller than a pre-tilt angle of liquid crystal molecules aligned by the first or the second alignment film in a second region on the picture element electrode, which is different from the first region,
which further includes a bus line adjacent to the picture element electrode, and
the first region is a region near the bus line.

17. A liquid crystal display according to claim 16, further comprising
a third alignment film formed on the first or the second alignment film in the second region,
a pre-tilt angle of liquid crystal molecules aligned by the third alignment film being larger than a pre-tilt angle of liquid crystal molecules aligned by the first or the second alignment film.

18. A method for fabricating a liquid crystal display comprising the steps of:
forming an electrode on a substrate;
forming an alignment film on the electrode; and
applying UV radiation to a first region of the alignment film in a first application amount and to a second region of the alignment film in a second application amount which is larger than the first application amount so that a pre-tilt angle of the liquid crystal molecules having negative dielectric anisotropy aligned by the alignment film in the first region is smaller than a pre-tilt angle of liquid crystal molecules having negative dielectric anisotropy aligned by the alignment film in the second region,
wherein in the step of applying UV radiation, UV radiation is applied by using a mask pattern having a lower UV transmittance corresponding to the first region.

* * * * *